(12) United States Patent
Akita

(10) Patent No.: US 6,282,478 B1
(45) Date of Patent: Aug. 28, 2001

(54) TRAVELLING DIRECTION CORRECTION APPARATUS

(75) Inventor: Tokihiko Akita, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/113,295

(22) Filed: Jul. 10, 1998

(30) Foreign Application Priority Data

Jul. 10, 1997 (JP) .................................................. 9-184673
Jul. 17, 1997 (JP) .................................................. 9-192462

(51) Int. Cl.[7] .............................. G06F 7/70; G01S 13/00
(52) U.S. Cl. ................................ 701/70; 701/23; 701/26; 701/70; 701/83; 701/210; 701/211; 701/213; 342/70; 342/71; 303/125; 303/132; 303/167
(58) Field of Search .................................. 701/70, 83, 91, 701/93, 23, 26, 300, 301, 302, 210, 211, 213; 303/9, 121, 125, 132, 146, 154, 168, 167; 342/70, 71

(56) References Cited

U.S. PATENT DOCUMENTS 4,673,937 * 6/1987 Davis ...................................... 342/72

FOREIGN PATENT DOCUMENTS

| | | |
|---|---|---|
| 6213660 | 8/1994 | (JP) . |
| 9432561 | 4/1995 | (JP) . |
| 8207737 | 8/1996 | (JP) . |
| 9-96507 | 4/1997 | (JP) . |

OTHER PUBLICATIONS

"A Warning and Intervention System to Prevent Road–Departure Accidents", D. LeBlanc, et al., Weekly System Dynamics Supplement 25 (1996), pp. 383–396, No Month.

* cited by examiner

Primary Examiner—William A. Cuchlinski, Jr.
Assistant Examiner—Yonel Beaulieu
(74) Attorney, Agent, or Firm—Sughrue, Mion, Zinn, Macpeak & Seas, PLLC

(57) ABSTRACT

A travelling direction correcting apparatus includes: a shift detection device for detecting a shift amount of a vehicle running on a road with respect to the road; a wheel brake pressure control device for pressure wheel brake pressures and controlling a wheel brake pressure distribution; and a cruise control device for commanding a wheel brake pressure distribution control to the wheel brake pressure control device. The wheel brake pressure distribution control includes the following processes: (1) at least one of a yaw rate, a lateral speed and a lateral acceleration is made an index, (2) a value of the index, which appears in the vehicle when its running direction is changed toward a direction along which the shift amount decreases, is added to a value of the index, which appears when the vehicle runs along a curved road, and a summed amount is made an object value and (3) the value of the index, which appears in the vehicle, is coincided with the object value.

20 Claims, 10 Drawing Sheets

TRAVELLING DIRECTION CORRECTION APPARATUS

BACKGROUND OF THE INVENTION

The present invention relates to an automatic correction device in which the deviation of a vehicle from a running lane is automatically monitored and, when the deviation occurs, a brake pressure applied to at least one of the left and right wheel brakes is automatically increased, thereby automatically adjusting a distribution between pressures applied to left and right wheel brakes and returning the vehicle to the running lane. Hereafter, an adjustment of brake pressure distribution between left and right wheel brakes, i.e., a change of vehicle's travelling direction by a differential braking, is referred to as "brake steering".

The above automatic correction of travelling direction is effective for temporarily securing the safety of the running vehicle, when a driver's watchfulness ahead of the running vehicle deteriorates, e.g., when the driver looks aside, falls asleep or is in a semi-comatose state before or after sleeping.

In "A Warning and Intervention System to Prevent Road-Departure Accidents" recited in Vehicle System Dynamics Supplement 25 (1996), pp 383–396, a vehicle travelling direction is automatically adjusted in the direction along which the vehicle moves by a feedback control in which a front view ahead of the vehicle is photographed by a television camera and a running lane is detected by image processing, vehicle behavior is inferred from information detected by another sensor mounted on the vehicle, and when an unintended deviation from the running lane occurs, the amount of deviation determines the amount of control with respect to wheel brake pressure distribution.

In "Correlation between Snaking of Vehicle and Awakening Degree" recited in Japan Automobile Technology Association's Scientific Lecture Preprints 941, pp. 25–28 published in May 1994, there is suggested a technique in which the front view ahead of the vehicle is photographed by a television camera, a white line partitioning a running lane is detected by image processing, and a lateral shift amount of the vehicle is computed, thereby detecting a snaking state of vehicle.

Detection of a running lane and detections of lane width, curve, a preceding vehicle or the like have been already suggested by the present applicant (for example, Japanese Patent Unexamined Publication No. 6-213660). Further, there has been suggested a technique in which a television camera for photographing a front view ahead of the vehicle is turned to follow a lane curve, thereby tracing a forward running lane (for example, Japanese Patent Unexamined Publication No. 9-96507). Furthermore, there has been suggested a distribution control technique for wheel brakes (for example, Japanese Patent Unexamined Publication No. 8-207737). By combining these techniques, the aforementioned automatic correction of travelling direction can be realized.

It is inferred that in the feedback control in which the amount of deviation determines the amount of control with respect to wheel brake pressure distribution, when the deviation amount is large, an increase in pressure for a wheel brake is high and when the former is small, the latter is low, so that the effect of correcting the deviation amount is high, but when the deviation amount is large a change in direction of the vehicle is great, so that depending on road conditions such an unstable behavior is liable to occur that an increase in wheel brake pressure becomes too high so the wheels are locked or that a change in direction of vehicle is so sharp the vehicle spins. Steering by a driver during running of a vehicle is performed generally in response to the car speed, a radius of curvature and the friction coefficient of the road surface. It is preferable that brake steering for the aforementioned automatic correction of travelling direction responds smoothly to a car speed, a radius of curve and a friction coefficient of road surface (these are combined and referred to as "running conditions"), and it is considered that brake steering not reflecting a driver's will should lay emphasis on a stable and gentle correction of direction rather than a rapid correction of the deviation amount. It is inferred that by introducing such parameters as a car speed, a radius of a curve, a yaw rate and the like to the aforementioned feedback control and revising the amount of operation in response to the above parameters, there is obtained an improvement in consistency and smoothness with respect to the running conditions. However, the characteristic that since the control amount is the deviation amount, if the deviation amount is large an increase in wheel brake pressure is high and a change in direction is large will be maintained because that characteristic is an object inherent in the aforementioned feedback control.

A driver in another vehicle is uneasy if a preceding vehicle, or a vehicle running in the opposite direction, rapidly changes its direction. In the event that another vehicle deviates from the lane, it is easier to cope with that vehicle when it returns slowly but stably and gradually to the lane judging from its running state than when it exhibits such a behavior that it returns rapidly to the lane.

It cannot be said that reliability of detecting a vehicle in the running lane is sufficient. Further, it is comparatively frequent that a deviation from the running lane or a change of the running lane is performed by a normal judgment of the driver in order to avoid another vehicle or an obstacle. Alternatively, the running lane is frequently changed as a result of the driver's intent. However, in these cases, a consistency between the driver's will and the brake steering is low. Therefore, it is preferable that a brake steering amount is made as small as possible in order to prevent a hindrance in driving the vehicle from occurring. To the contrary, when the driver's power of attention deteriorates (e.g., when the driver looks aside or falls asleep), it is preferable that the brake steering is strongly applied in the event that the vehicle deviates from the lane. However, at present it is difficult to realize these problems simultaneously by a feedback control.

Further, in a usual road in which there are many parked or stopped vehicles and many telephone or electric poles, the radius of curvature is small or across which many people and vehicles traverse, an error in detecting the running lane is liable to occur. Further, even if the running lane is accurately detected, a change of running lanes and a deviation from a lane is frequently performed. Under such situations, in view of the driver's recognition and intention, it is highly possible that the aforementioned automatic correction of travelling direction becomes a malfunction and becomes an erroneous interference to the driver. When a vehicle runs on a large road, e.g., a freeway (road exclusively for vehicles), on which it can keep a comparatively high speed with little possibility of sharp steering for avoiding another vehicle or the like and whose smallest radius of curve is comparatively large, driving at a substantially constant speed with little steering continues for a long time. For example, there is also a situation where the driver selects an automatic cruising which conducts an intra-vehicle control or a fixed speed control. Under such running conditions, since the incentive to stay awake is small, it is liable to make the driver sleepy.

The aforementioned automatic correction of travelling direction is effective for supplementing the driver's carelessness under such running conditions.

SUMMARY OF THE INVENTION

A first object of the present invention is to provide brake steering which is high in consistency with respect to the running conditions and is high in stability of direction correction. A second object of the present invention is to provide brake steering which jogs an uplift of the driver's power of attention.

Further, a third object of the present invention is to increase the reliability of the aforementioned automatic control of travelling direction, which is appreciated by the driver. A fourth object of the same is to suppress an erroneous interference with the driver. A fifth object of the same is to increase the consistency and smoothness of brake steering with respect to the running conditions of vehicle.

A first mode of the present invention for achieving the above first and second objects relates to the following (1).
(1) A travelling direction correcting apparatus comprising::
   a shift detection device (140, 160) for detecting a shift amount of a vehicle (CAR) running on a road with respect to the road;
   a wheel brake pressure control device (10, 30) for increasing the pressure in wheel brakes (51–54) of the vehicle and controlling wheel brake pressure distribution; and
   cruise control means (100) for commanding a wheel brake pressure distribution control to the wheel brake pressure control device (10, 30), where in the wheel brake pressure distribution control the following processes are implemented:
   (1) at least one of a yaw rate (Y), a lateral speed and a lateral acceleration (GY) provides an index,
   (2) a value (yawS) of the index, which appears in the vehicle when its running direction is changed toward a direction along which the shift amount decreases, is added to a value (v/R) of the index, which appears when the vehicle runs along a curved road, and a summed amount (v/R+yawS) is made an object value and
   (3) the value (Y) of the index, which appears in the vehicle, is coincided with the object value (v/R+yawS).

The above wheel brake pressure distribution control, i.e., brake steering is not one in which the shift amount (deviation amount) is made a control amount, but the feedback control in which the yaw rate (Y), the lateral speed and/or the lateral acceleration (GY) are/is made a control amount. In the embodiment mentioned later by referring to the drawings, since the yaw rate (Y) is made a control amount, it is explained on the basis of this embodiment. The brake steering is a feedback control in which the yaw rate is made a control amount and the wheel brake pressure is made an operation amount. Since the yaw rate (Y) is a value responding to vehicle's running conditions, the summed value (v/R+yawS) obtained by adding the yaw rate (yawS) for brake steer to the yaw rate (Y≈v/R) appearing when the brake steering is not acting is made an object value. If the wheel brake pressure distribution is controlled in such a manner that an actual yaw rate (Y: detection amount) coincides with the object value (v/R+yawS), a brake steering generating the yaw rate (yawS) by an amount of basis acts on the vehicle.

A steering amount due to this steering does not depend on the shift amount (deviation amount), but is one which additionally generates the yaw rate b an amount of bias irrespective of what the vehicle speed (v) and the road curve radius (R) are. In other words, the vehicle is given a desired change of direction without being influenced by its running condition. In the embodiment mentioned later, the yaw rate by an amount of bias is expressed as yawS=±2°/sec and is a low value. This yaw rate value is one which falls within a range defined by a lower limit value necessary for applying an effective pressure to the wheel brake and upper limit value below which it can be deemed that the vehicle's direction change is moderate and, moreover, it a value which is slightly lower than an intermediate value between the above lower and upper limit values. By this, the vehicle's direction change becomes one which is stable and moderate.

(2) The travelling direction correcting apparatus further comprises annunciator means (110, 120), the cruise control means (100) emits a primary alarm at said annunciator means (110, 120) when the shift amount is more than a first set value (0 m), emits a secondary alarm at said annunciator means when the shift amount is more than a second set value (1 m) which exceeds the first set value and commands the wheel brake pressure distribution control to the wheel brake pressure control device (10, 30).

According to this, the first alarm is emitted when the vehicle's shift (deviation amount) from the lane is about to become large. When the vehicle's shift (deviation amount) is large, the secondary alarm (i.e., brake steering implementation annunciation) is emitted and brake steering in the above (1) is automatically implemented.

(3) The above index is a yaw rate (Y).

(4) A travelling direction correcting apparatus comprising:
   a shift detection device (140, 160) for detecting a shift amount of a vehicle (CAR) running on a road with respect to the road;
   a wheel brake pressure control device (10, 30) for increasing the pressure in the wheel brakes (5154) of the vehicle and controlling a wheel brake pressure distribution; and
   annunciator means (110, 120); and
   cruise control means (100) which emits a primary alarm at the annunciator (110, 120) when the shift amount is more than a first set value (0 m), emits a secondary alarm when the shift amount is more than a second set value (1 m) which exceeds the first set value and commands a wheel brake pressure distribution control for decreasing the shift amount and fluctuating the shift amount in timed series to the wheel brake pressure control device (10, 30).

According to this, the first alarm is emitted when the vehicle's shift (deviation amount) from the lane is about to become large. When the vehicle's shift (deviation amount) is large, the secondary alarm (i.e., brake steering implementation annunciation) is emitted and the brake steering is automatically implemented. Since this brake steering decreases the lane deviation and fluctuates the shift amount in time series, the vehicle fluctuates leftward/rightward with respect to the direction along which the vehicle is traveling which is considered the center, thereby exerting a yaw rate vibration (lateral acceleration vibration) to the driver. This is different from the usual rate during steady running, so that the driver's power of attention is heightened. It is an advantage that the concerned vehicle attracts another driver's attention.

(5) The travelling direction correcting apparatus further comprises means (YA) for detecting a yaw rate of said vehicle, wherein the wheel brake pressure control device (10, 30) performs a wheel brake pressure distribution in which a vibration yaw rate [yawS (1+sin ωτ)], which is formed by superimposing a fluctuation yaw rate (sin ωτ) increasing/decreasing in time series to a yaw rate (yawS) for correcting a shift in the same direction as a direction of a yaw rate appearing in the vehicle when its running direction is changed toward a direction along which the shift amount decreases, is computed and a yaw rate (Y) detected by the yaw rate detecting means (YA) is changed by an amount of the vibration yaw rate.

(6) The wheel brake pressure control device (10, 30) performs a wheel brake pressure distribution in which a value, which is obtained by adding the vibration yaw rate [yawS (1+sin ωτ)] to a yaw rate (v/R) appearing in the vehicle correspondingly to a vehicle speed (v) and a curve radius (R) of the road, is made an object yaw rate [yawO=v/R+yawS (1+sin ωτ) ] and a yaw rate (Y) detected by the yaw rate detecting means (YA) is coincided with the object yaw rate (yawO).

(7) The cruise means (100) tests yes/no of a travelling direction correction and, in the event that it is yes, emits a primary alarm at the annunciator means (110, 120) when the shift amount (deviation amount) is more than a first set value (0 m), emits a secondary alarm at the annunciator means (110, 120) when the shift amount is more than a second set value (1 m) which exceeds the first set value and commands a wheel brake pressure distribution control for decreasing the shift amount (deviation amount) to the wheel brake pressure control device (10, 30).

According to this, "yes" is judged in accordance with a logic testing yes/no of the travelling direction correction and moreover the first alarm (i.e., preliminary alarm is emitted when the vehicle's shift (deviation amount) from the lane is going to become large. When y is judged in accordance with a logic testing yes/no of the travelling direction change and moreover the vehicle's shift (deviation amount) is large, the second alarm (i.e., brake steering implementation annunciation) is emitted and the brake steering is implemented. If the vehicle is returned by the driver to lane center in response to the primary alarm, the primary alarm is extinguished and the brake steering does not start.

If a result of the travelling direction yes/no testing is "no", the primary alarm is not emitted, and the reliability of the primary alarm is high and so the effect of arousing the driver's attention is high. Since the second alarm exists when the brake steering is working due to an automatic intervention of the cruise control means (100), the driver can recognize the fact that the brake steering is working. The reliability with respect to the travelling direction automatic correction appreciated by the driver becomes high. By heightening the reliability of the travelling direction correction yes/no testing, erroneous interference with the driver becomes shall and moreover a consistency and a smoothness of the brake steering with respect to the vehicle's running conditions becomes high.

For example, when the driver is dozing off and is not sufficiently awakened by the primary and secondary alarms, the vehicle fluctuates leftward/rightward with respect to the direction along which the vehicle is travelling which is considered the center, thereby exerting a yaw rate vibration (lateral acceleration vibration) to the driver. This is different from the yaw rate during a steady running and stimulates the driver, so that the effect of awakening a driver is high.

(8) The cruise control means (100) commands a stoppage of the wheel brake pressure distribution control to the wheel brake pressure control device (10, 30) in response to the operation of equipment on the vehicle, which is performed by a driver. According to this, if the driver operates the equipment on the vehicle by being stimulated by the primary alarm, the secondary alarm or the fluctuating brake steering, the travelling direction correction is stopped. Since the primary alarm and the secondary alarm arouse the driver's attention and the travelling direction correction is stopped in response to the driver's equipment operation, interference to driving by the driver is small and the reliability appreciated by the driver becomes high.

A second mode of the present invention for achieving the aforementioned third and fourth objects relates to the following (1).

(1) A travelling direction correcting apparatus comprising:
a shift detection device (160, 140) for detecting a shift amount (deviation amount) of a vehicle (MCR) running on a road with respect to said road;
a wheel brake pressure control device (10, 30) for increasing wheel brake pressure (51–54) of said vehicle and controlling wheel brake pressure distribution;
annunciator means (110, 120); and
cruise control means (100) for commanding a wheel brake pressure distribution control to the wheel brake pressure control device (10, 30), wherein in the wheel brake pressure distribution control the following processes are implemented:
(1) yes/no of a travelling direction correction is tested and
(2) in the event that it is yes, when the shift amount (deviation amount) is more than a first set value (0 m) a primary alarm is emitted at the annunciator means (100, 120) and when said shift amount is more than a second set value (1 m) which exceeds the first set value a secondary alarm is emitted at the annunciator means (100, 120), thereby decreasing the shift amount (deviation amount). "Yes" is judged in accordance with a logic testing yes/no of the travelling direction correction and moreover the first alarm i.e., preliminary alarm is emitted when the vehicle's shift (deviation amount) from the lane is going to become large. When Y is judged in accordance with a logic testing yes/no of the travelling direction change and moreover the vehicle's shift (deviation amount) is large, the second alarm i.e., brake steering implementation annunciation) is emitted and brake steering is implemented. If the vehicle is returned by the driver to lane center in response to the primary alarm, the primary alarm is extinguished and brake steering does not start.

If a result of the travelling direction yes/no testing is "no", the primary alarm is not emitted, and a reliability of the primary alarm is high and so the effect of arousing the driver's attention is high. Since the second alarm exists when the brake steering is working owing to an automatic intervention of the cruise control means (100), the driver can recognize the fact that the brake steering is working. The reliability with respect to the travelling direction automatic correction appreciated by the driver becomes high. By heightening the reliability of the travelling direction correction yes/no testing, an erroneous interference with the driver becomes small and moreover the consistency and the smoothness of the brake steering with respect to the vehicle's running conditions become high.

(2) The cruise control means (100) judges that the travelling direction correction is yes when the vehicle speed automatic control (intra-vehicle control/fixed speed run) is instructed by a driver.

In the embodiment mentioned later, if a fixed speed run is instructed by a switch operation of a driver, the cruise control means (100) writes a vehicle speed at that time in a object vehicle speed register. Thereafter, until a fixed speed run release condition is brought into existence, a throttle valve of engine mounted on the vehicle is subjected to an open/close control in such a manner that the vehicle speed coincides with the vehicle speed (object vehicle speed) of the object vehicle speed register. If an intra-vehicle control is instructed by a switch operation of the driver, until an intra-vehicle release condition is brought into existence, the throttle valve is subjected to an open/close control in such a manner that the distance from a preceding vehicle detected by a shift detection device (160, 140) becomes an intra-vehicle distance suitable for the vehicle speed.

These vehicle speed automatic controls are suitable for a run on a road, such as a freeway, on which the vehicle can keep a comparatively high speed and the possibility of sharp steering for avoiding, for example, another vehicle is low and whose minimum curve radius is comparatively large. Start conditions and release conditions of the above automatic controls are highly similar to those of the brake steering. It is inferred from the fact that the above automatic controls are being implemented, correction (brake steering) is high and moreover safety in its implementation is high as well. Therefore, according to the present implementation mode, it may be said that the reliability of the travelling direction correction yes/no testing is high, an erroneous interference with a driver's driving is low and moreover the brake steering consistency and smoothness with respect to the vehicle running condition is high.

(3) The cruise control means (100) judges that the travelling direction correction is yes when the vehicle running speed (V) continues for a time longer than a set time (five minutes) at a speed higher than a set value (60 Km/H). From this, it is inferred that the running state is stable and, moreover, a further stable run continues. In this case, since there is a possibility that a driver becomes careless, it is inferred that the necessity of the travelling direction correction (brake steering) is high and moreover safety in its implementation is high as well. Therefore, according to the present implementation mode, it may be said that reliability of the travelling direction correction yes/no testing is high, an erroneous interference with a driver's driving is low and moreover the brake steering consistency and smoothness with respect to the vehicle running is high.

(4) The cruise control means 100 judges that the travelling direction correction is yes when the running road information on the basis of GPS position measurement and map data are (freeway/road exclusively for vehicles) corresponding to the vehicle speed automatic control yes. In the embodiment mentioned later, the GPS information processing ECU (190) computes a present position of vehicle on the basis of information received from GPS satellite, and map information possessed by the ECU (190) is referenced with the present position and a relative position between the road on which the vehicle is running, the present position on the map and the index is computed and outputted. In the map data, there are additional data representing the road's standards and regulations. The cruise control means (100) obtains such additional information from the GPS information processing ECU (190), and judges whether the road, on which the vehicle is running at present, is one on which it can run stably at a high speed for a long time. If it is judged so, it is judged that the travelling direction correction is yes.

Precision and stability of the GPS position measurement and those of the map data, both being available nowadays, are high. Further, in case of a freeway, the vehicle's adaptability to the vehicle speed automatic control is high and so there is such a possibility that the driver will become careless. Accordingly, it is inferred that the necessity of travelling direction correction (brake steering) is high and safety in implementing it is high as well. Therefore, according to the present implementation mode, it may be said that reliability of the travelling direction correction yes/no testing is high an erroneous interference with a driver's driving is low and moreover the brake steering consistency and smoothness with respect to the vehicle running is high.

(5) The cruise control means (100) judges that the travelling direction correction is yes when the instruction that the travelling direction correction is yes has been instructed (deviation alarm main SW is ON) by a driver. Since the travelling direction correction is made yes by the driver's will, and since it is possible for the driver to release that instruction to thereby make the travelling direction correction no, adaptability to the driver's will is high.

(6) The cruise control means (100) judges that the travelling direction control is yes when a curve radius (R) of a running lane detected by the deviation detection device (160, 140) is larger than a set value (900 m) and a running time continues for a time longer than a set time (five minutes). From this, it is inferred that the running state is stable and, moreover, a further stable running continues. In this case, since there is a possibility that a driver becomes careless, it is inferred that the necessity of the travelling direction correction (brake steering) is high and moreover safety in its implementation is high as well. Therefore, according to the present implementation mode, it may be said that reliability of the travelling direction correction yes/no testing is high, an erroneous interference with a driver's driving is low and moreover, the brake steering consistency and smoothness with respect to the vehicle running is high.

A travelling direction correcting apparatus comprising:
  a shift detection device (160, 140) for detecting a shift amount deviation amount of a vehicle (MCR) running on a road with respect to the road;
  a wheel brake pressure control device (10, 30) for pressure-increasing wheel brakes (51–54) of the vehicle and controlling a wheel brake pressure distribution;
  annunciator (110, 120) means; and
  cruise control means (100) which emits a primary alarm at the annunciator means (110, 120) when the shift amount (deviation amount) is more than a first set value (0 m), emits a secondary alarm at the annunciator means (110, 120) when the shift amount is more than a second set value (1 m) which exceeds the first set value, commands a wheel brake pressure distribution control for decreasing the shift amount to the wheel brake pressure control device (10, 30) and commands a stoppage of the wheel brake pressure distribution control to the wheel brake pressure control device (10, 30) in response to an operation of equipment on the vehicle, which is performed by a driver.

According to this, the first alarm is emitted when the vehicle's shift (deviation amount) from the lane is going to become large. When the vehicle's shift (deviation amount) is large, the secondary alarm (i.e., brake steering implementation annunciation) is emitted and the brake steering is automatically implemented. When the primary alarm or the secondary alarm is emitted, if a driver operates the equipment mounted on the vehicle, the travelling direction correction is stopped and the above alarm stops. Since the primary alarm and the secondary alarm arouse the driver's attention and the travelling direction correction is stopped in response to the driver's equipment operation, interference with the driving by the driver is low and a reliability appreciated by the driver becomes high.

An operation effected by the driver to actuate the equipment on the vehicle is a turning the steering wheel mounted on the vehicle. When the deviation from the lane occurs, the member to be operated by the driver is the steering wheel. When a steering contradictory to the turning of steering wheel, an erroneous interference with the driver's will occurs by any chance, the driver stops the travelling direction change by the brake steering and operates the steering wheel in order to change the direction to an intended direction. In the present implementation mode, since the travelling direction correction is stopped in response to the driver's action and the reliability appreciated by the driver becomes high.

(9) An operation effected by the driver to actuate the equipment on the vehicle is a turning of a steering wheel whose torque exceeds a set value (2 Nm). When the brake steering is contradictory to the driver's will, the driver stops the travelling direction change by the brake steering and operates the steering wheel in order to change the direction to an intended direction. In this case, the operation of steering wheel intends a direction change which is reverse in direction to the travelling direction change by the brake steering, so that rotational torque of the steering wheel is high. In the present implementation mode, since the travelling direction correction is stopped in response to this high torque, the brake steering is automatically stopped when the brake steering becomes an erroneous interference with the driving of the driver. Therefore, reliability appreciated by the driver becomes high.

(10) An operation effected by the driver to actuate the equipment on the vehicle is a turn signal operation. If the driver operates a turn signal to change the lane, since the travelling direction correction is stopped, the brake steering automatically stops when it becomes an erroneous interference with the lane change effected by the driver.

(11) An operation effected by the driver to actuate the equipment on the vehicle is an application of the brake pedal. Usually, the driver applies the brake pedal when avoiding nearness to another vehicle. Further, the brake pedal is applied when the vehicle reaches a state that the vehicle exhibits non-intended behavior. In that case, the brake steering is automatically stopped and it automatically stops when there is a possibility that it becomes an erroneous interference to the driving of a driver.

(12) A travelling direction correcting apparatus comprising:
  a shift detection device (160, 140) for detecting a shift amount (deviation amount) of a vehicle (MCR) running on a road with respect to the road;
  a wheel brake pressure control device (10, 30) for pressure-increasing wheel brakes (51–54) of the vehicle and controlling a wheel brake pressure distribution;
  Annunciator means (110, 120); and
  cruise control means (100) which emits a primary alarm at the annunciator means (110, 120) when the shift amount (deviation amount) is more than a first set value (0 m), emits a secondary alarm at the annunciator means (110, 120) when the shift amount (deviation amount) is more than a second set value (1 m), which exceeds the first set value, and commands a wheel brake pressure distribution control for decreasing said deviation amount to the wheel brake pressure control device (10, 30), and; if the shift amount decreases to a value less than a third set value (10 m) which is less than the second value, commands a stoppage of said wheel brake pressure distribution control to said wheel brake pressure control device (10, 30), thereby stopping the alarm or changing said alarm to another annunciation.

According to this, the first alarm is emitted when the vehicle's shift (deviation amount) from the lane is going to become large. When the vehicle's shift (deviation amount) is large, the secondary alarm (i.e., brake steering implementation annunciation) is emitted and the brake steering is automatically implemented. This brake steering stops when the shift (deviation amount) has decreased to a third set value (0 m) less than the second set value which is a starting threshold of the brake steering. That is, with respect to start/finish of the brake steering, there are hysteresis characteristics to the shift (deviation amount).

By this, there is no possibility that the brake steering is repeated in comparatively short cycle in such a manner that, e.g., if the shift (deviation amount) becomes above the second set value, the brake steering starts→by this brake steering if the shift (deviation amount) becomes below the second set value, the brake steering stops→by a small displacement if the shift (deviation amount) becomes the second set value, the brake steering starts. Therefore, reliability of automatic correction of travelling direction, which is appreciated by the driver, is improved and the brake steering consistency and smoothness with respect to the vehicle running conditions is high.

Other objects and features of the present invention will become clear by the following description of embodiments making reference to the drawings.

DESCRIPTION OF THE PREFERRED EMBODIMENTS

Figure 1:
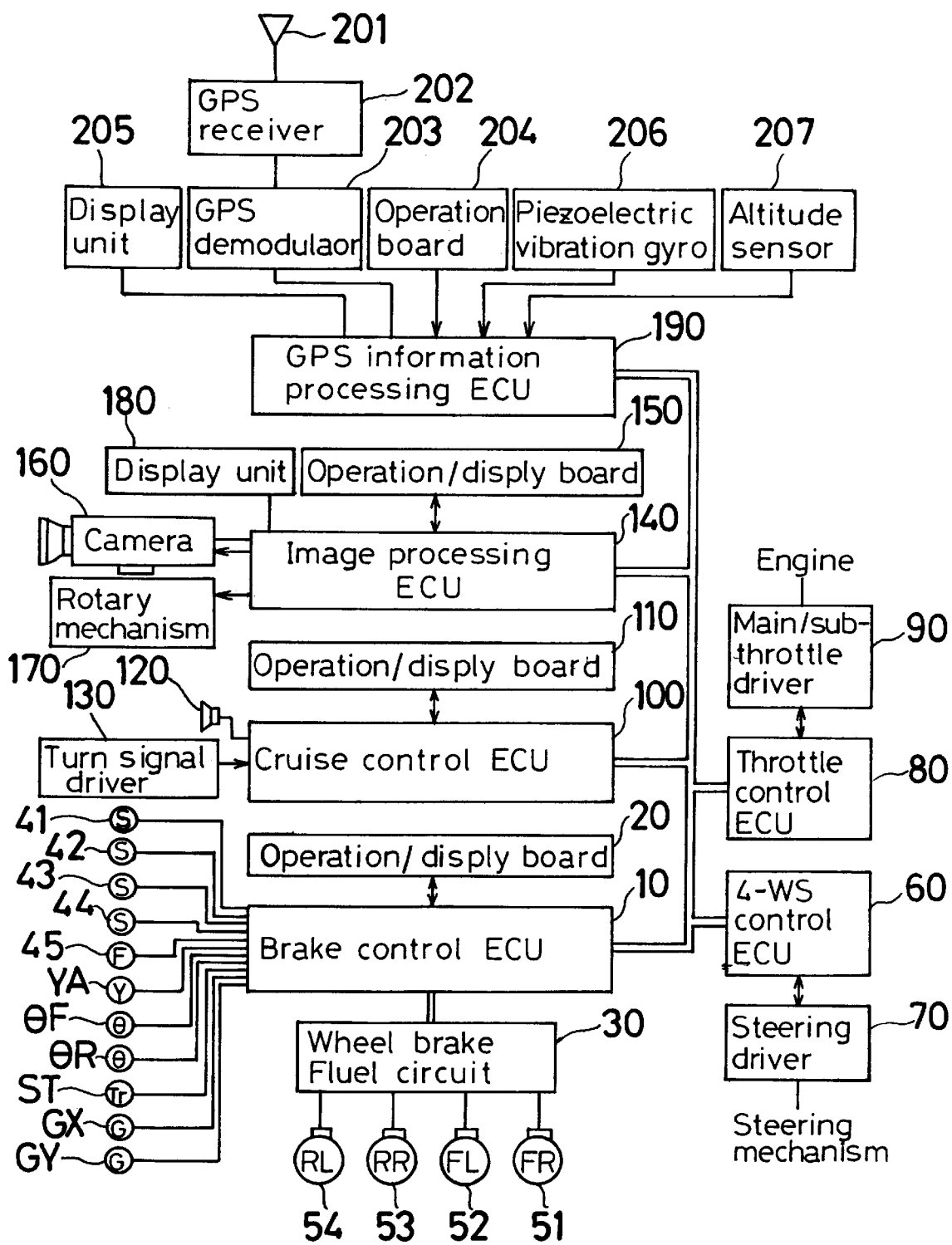
FIG. 1 is a block diagram showing one embodiment of the present invention.

In FIG. 1, there is shown one embodiment of the present invention, which is mounted on a vehicle. A GPS position measurement device comprises a receiving antenna 201, a GPS receiver 202, a GPS demodulator 203, a display unit 205, a piezoelectric vibration gyro 206, an altitude sensor 207, a GPS information processing ECU (electronic control unit) 190 and an operation board 204. An electric wave of 1.5742 GHz transmitted from each satellite of the GPS is received by the GPS receiver 202 via the receiving antenna 201, and information, i.e., information on a function representing the satellite's orbit, a time and the like, are demodulated by the demodulator 203 and inputted to the GPS information processing ECU 190. The GPS information processing ECU 190 is a computer system which comprises an armanac data memory, a map memory and a memory for date buffer as well as an input/output interface (electric and/or electronic circuit) and which has a microprocessor as its main component. The CPU generates information (latitude, longitude, altitude) representing a position of the concerned vehicle on the basis of information transmitted from the GPS satellite, and on the basis this position information one page (one screen) containing the above position is read from the map memory and this is displayed on the display unit 205, thereby displaying a present position index to the present position on display. Basic constituent such as the receiving antenna 201, the GPS receiver 202, the GPS demodulator 203 and the display unit 205 as well as basic operations of the GPS information processing ECU 190 are similar to respective constituent elements of a known apparatus already on sale.

Analog signals outputted by the piezoelectric vibration gyro 206 and the altitude sensor 207 are respectively inputted to the GPS information processing ECU 190, and in the GPS information processing ECU 190 the inputted information is converted to digital data via an A/D converter and read thereby. Information outputted from the GPS demodulator 203 and information for controlling the GPS demodulator 203 are inputted to the CPU or outputted from the CPU via I/O port of the GPS information processing ECU 190.

The GPS information processing ECU 190 computes three-dimensional coordinates Ux, Uy, Uz for the position of the concerned vehicle by a "3-satellite position measurement operation" or a "4-satellite position measurement operation".

In a "3-satellite position measurement operation", three sets of data received from three satellites are substituted, respectively as parameters, to ternary simultaneous equations having been determined beforehand, and a latitude and a longitude at a reception point, which are unknowns, and a clock error at the reception side are obtained by solving these simultaneous equations. Further, in a "4-satellite position measurement operation", four sets of data received from four satellites are substituted, respectively as parameters, to quadruple simultaneous equations having been determined beforehand, and a latitude and a longitude at a reception point, which are unknowns, and a clock error at the reception side are obtained by solving these simultaneous equations. Furthermore, since the clock error at the reception side is obtained by either of the above position measurement operations, a built-in clock is calibrated on the basis of this error information.

On the basis of position information obtained by the GPS position measurement, a map data of one page (one screen) containing that position is read from a map memory, and this is displayed on the display unit 205, thereby displaying the present position index for the present position on display. Then, the GPS information processing ECU 190 reads additional information, such as "road information, representing standards and regulations for a road on which the present position is located, and information representing this is displayed on the display unit 205 and data representing that the GPS data is effective and the road conditions are written in an output data storage area, which is addressed to a cruise control ECU 100 with a memory for DMA transfer within the GPS information processing ECU 190. When the GPS position measurement is unsuccessful, "invalid" is newly written in the above area, and when the GPS position measurement is successful, the fact that the GPS data is valid and the road information are newly written in the above area every time the road information is read from the map memory. The cruise control ECU 100 (its CPU) can read the data in the above area by using the DMA transfer when needed.

Figure 2:
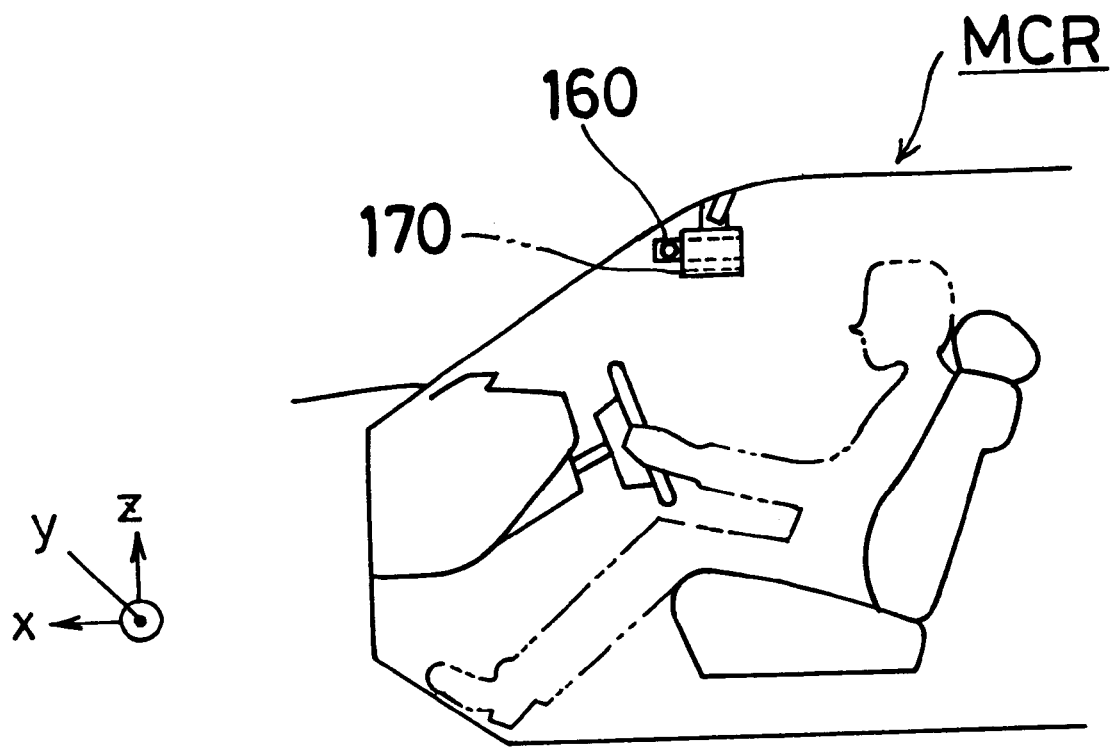
FIG. 2 is a side view of a driver's seat in a vehicle equipped with a television camera 160 shown in FIG. 1.

A television camera 160 supported by a rotary mechanism 170 is connected to an image processing ECU 140. The rotary mechanism 170 contains therein an electric motor for rotary drive and reduction gears, and the camera 160 is fixed to an output rotary shaft of the reduction gears. The rotary mechanism 170 is supported by a frame, and as shown in FIG. 2 it is disposed in the vicinity of a central, upper portion of a front window within a vehicle MCR. The television camera 160 photographs a scene in front of the vehicle and outputs analog signals of 512×512 pixels per one frame.

In case of a curved road, there is a strong possibility that the camera photographs in a direction deviated from the road. Accordingly, in the present embodiment, the image processing ECU 140 performs the detection of the running lane in front of the vehicle, a computation of a curve radius R of the lane, a computation of lane width, a computation of lane deviation amount (shift amount) of the concerned vehicle MCR, a detection of a preceding vehicle and a computation of the distance from the preceding vehicle, and when a preceding vehicle is not detected, the camera 160 is rotated in such a manner that the center of the camera's field of view is coincident with the lane center. When a preceding vehicle exists in the camera's field of view, the camera is rotated in such a manner that the preceding vehicle is placed in the center of the field of view.

The camera 160 and constitution and function of the image processing ECU 140 are similar to those suggested in the aforementioned Japanese Patent Unexamined Publication No. 6-213660. Further, constitution and function relating to rotating the camera 160 are similar to those suggested in the aforementioned Japanese Patent Unexamined Publication No. 9-96507.

The image processing ECU 140's constitution and function and the camera 160 and constitution and function of the camera's rotating mechanism are similar to those suggested in the aforementioned Japanese Patent Unexamined Publication No. 9-96507. The camera's photographed image is image-processed to detect a left white line (L: detection line) and a right white line (R: detection line) which partition a running lane, and a center line (Y) with respect to the vehicle width is defined and, thereafter, the lateral distance XL between L and Y and the lateral distance XR between Y and R are computed. This processing technique is disclosed in the aforementioned Japanese Patent Unexamined Publication No. 6-213660. In the present embodiment, the image processing ECU 140 further computes the vehicle's left-side deviation amount [(Vw/w)−XL] with respect to the lane and the vehicle's right-side deviation amount [Vw/2−XR]. Vw is a vehicle width (lateral width). As between the left-side and right-side deviation amounts, the larger value is considered the lane deviation.

Information of this lane deviation and whether the lane deviation exists left-side or right-side and information representing lane detection data, a lane curve radius R, a preceding vehicle detection -yes/no and a preceding vehicle distance (when a preceding vehicle is detected) are written together in a storage area, which is addressed to the cruise control ECU 100 and a memory for DMA transfer within the image processing ECU 140. When the detection of a running lane is unsuccessful, "invalid" is written or updated in the storage area. When the detection of a running lane is successful, every time the computation or detection of the curve radius R, the vehicle deviation amount, the presence of a preceding vehicle -yes/no and the preceding vehicle distance is performed, this information is written or updated in the storage area. The cruise control ECU 100, by means of its CPU, can read data in the storage area by using DMA transfer when desired.

A wheel brake fluid circuit 30 contains a brake pedal, a vacuum booster and a brake master cylinder, and further contains a first brake pressure source which generates a brake pressure corresponding to the driver's brake pedal applying force, a second brake pressure source which generates a second pressure by a pump that is driven by a motor, and an electromagnetic valve for wheel brake pressure operation, which selectively supplies one of the first pressure and the second pressure to wheel brakes 51–54 as disclosed in the aforementioned Japanese Patent Unexamined Publication No. 8-207737.

A brake control ECU 10 estimates a vehicle drift amount and a vehicle spin amount, and on the basis of these estimated values it is judged whether a vehicle turning is in an excessively insufficient area and if it is in the excessively insufficient area, a wheel brake whose wheel brake pressure should be increased is determined, and the second pressure is supplied to the determined wheel via the wheel brake fluid circuit 30. That is, a wheel brake pressure distribution control is performed. As this distribution control, there are "B-STR control" for all wheels and "2-BDC control" for two rear wheels. As to "B-STR control" for all wheels, there are additional controls, i.e., "B-STR-OS" control for suppressing an over-steering and "B-STR-US" control for suppressing an understeering. The brake control ECU 10 further implements "ABS control" (antiskid control) and "TRC control" (traction control) as well.

A rotating speed of each of wheels 51–54, i.e., wheels of front-right, front-left, rear-right and rear-light, is detected respectively by wheel speed sensors 41–44, and an electric signal (wheel speed signal) representing each wheel speed is given to the brake control ECU 10. A brake SW 45 which is closed when the brake pedal is applied gives an electric signal representing its open (pedal is not applied: OFF)/close (pedal is applied: ON) condition to the brake control ECU 10.

A yaw rate of the vehicle is detected by a yaw rate sensor A, and an electric signal representing the yaw rate (actual yaw rate) $\gamma$ is generated and given to the brake control ECU 10. A turning angle of steering wheel is detected by a front wheel steerage angle sensor $\theta F$, and an electric signal representing a front wheel steerage angle $\theta f$ is given to the brake control ECU 10. A steerage angle of rear wheel is detected by a rear wheel steerage angle sensor OR, and an electric signal representing a rear wheel steerage angle $\theta r$ is given to the brake control ECU 10. A steering torque Tr exerted on a front wheel steering mechanism is detected by a torque sensor ST, and an electric signal representing the steering torque Tr is given to the brake control ECU 10. A forward/rearward acceleration gx of car body is detected by an acceleration sensor (GX sensor), and an electric signal representing the forward/rearward acceleration is given to the brake control ECU 10. A lateral acceleration gy of car body is detected by an acceleration sensor (GY sensor), and an electric signal representing the lateral acceleration is given to the brake control ECU 10.

The brake control ECU 10 reads information of the above sensors, switches and the like and computes data used in ABS control, 2-BDC control (braking force distribution control for two rear wheels), TRC control and B-STR control (braking force distribution control for four wheels), and on the basis of these it is judged whether a start, a continuation or a finish of the above, various controls is necessary or not. And "ABS control", "2-BDC control", "TRC control" and/or "B-STR control" are performed depending on the judgment, thereby generating a wheel brake pressure operation output (open/close and timing of the electromagnetic valve) for these various controls, and the wheel brake fluid circuit 30 is operated by adjusting the wheel brake pressure operation output on the basis of a priority order of the above, various controls. That is, the electromagnetic valve is operated. When a steering by the braking force distribution control is insufficient, the brake control ECU 10 gives a steering instruction to 4-WS control ECU 60 and further gives a command for closing a sub-throttle to a throttle control ECU 80, and thus a sub-throttle of engine is closed by a throttle driver 90, thereby decreasing an output of engine. Contents of these controls are ones suggested in the aforementioned Japanese Patent Unexamined Publication No. 8-207737.

In the present embodiment, in the brake control ECU 10, the cruise control ECU 100 revives the detected signals and data of the sensors, the switches, etc. and the information representing the data computed by the ECU 10 and the determined control mode. In addition, there is a memory for DMA transfer and for receiving a brake steering command and a command value (object yaw rate) from the cruise control ECU 100, and the brake control ECU 10 performs either of the aforementioned "2-BDC control" and "B-STR control". At this time, it is checked whether there are, in a command receiving area of the memory for DMA transfer, a brake steering command and command values (lane deviation amount and curve radius) from the cruise control ECU 100. When they exist, an object yaw rate yawO is computed on the basis of the command values, and an object yaw rate of the wheel brake pressure distribution control, which has been generated by the ECU 10 for "2-BDC control" and "B-STR control", is corrected (biased) by an amount corresponding to the object yaw rate yawO for the brake steering, which has been commanded by the cruise control ECU 100, thereby determining the wheel brake pressure distribution in response to the corrected object yaw rate. By this, a brake steering intended by the cruise control ECU 100 is implemented by the brake control ECU 100.

Figure 8:
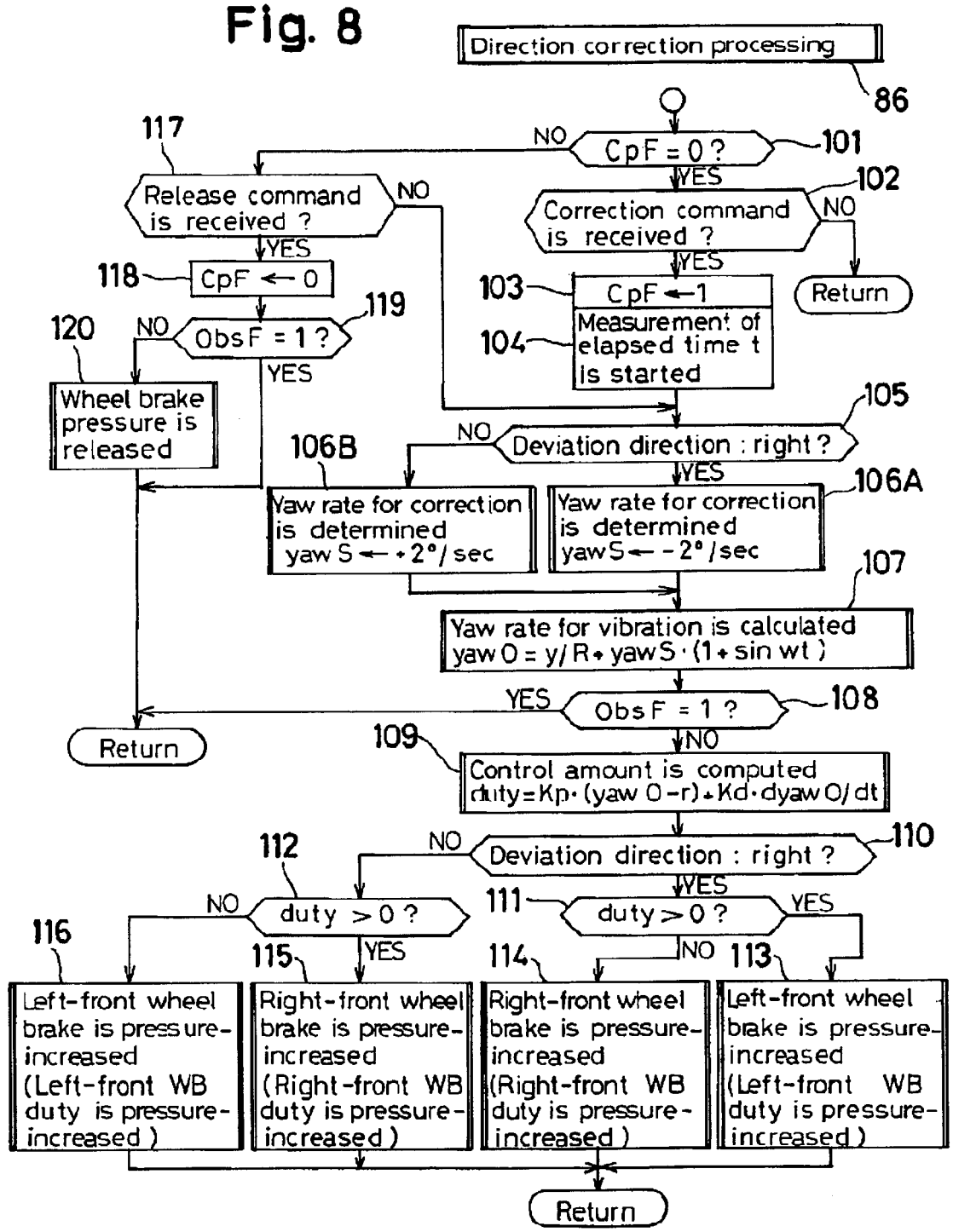
FIG. 8 is a flowchart showing one mode of the "direction correction processing" 86 shown in FIG. 7.

When both "2-BDC control" and "B-STR control" are unnecessary, if the brake steering command and the common values are received from the cruise control ECU 100, the brake control ECU 10 implements the wheel brake pressure distribution control only for this brake steering. Content of this is shown in FIG. 8 and described later. In the brake control ECU 10, the detection signals of the sensors, the switches, etc. are read at a predetermined cycle, a predetermined data processing is performed, and information representing the computed or processed data and the determined control mode are written in the data storage area, which is addressed to the cruise control ECU 100, of the memory for DMA transfer. The cruise control ECU 100 can read the data in the above area by using the DMA transfer when desired.

The main function of the cruise control ECU 100 is a cruise control (fixed speed running control/inter-vehicle distance control) and a lane deviation control.

Figure 3:
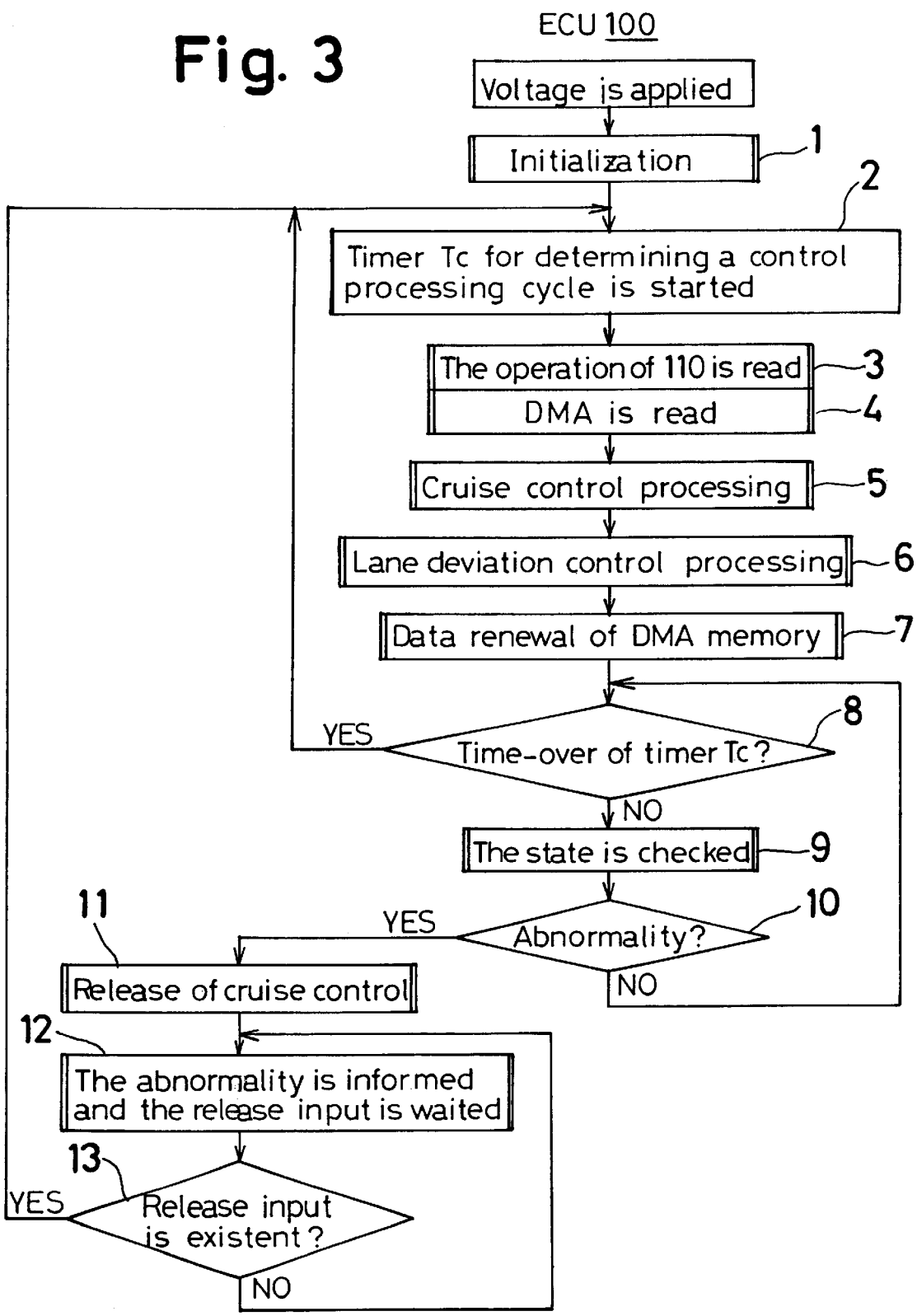
FIG. 3 is a flowchart of the processing function of a cruise control ECU 100 shown in FIG. 1.

In FIG. 3, the gist of the processing function of the cruise control ECU 100 is shown. When an operating voltage is applied, the cruise control ECU 100 sets a built-in register, an input/output port and a built-in timer to their initial states, and sets an input/output interface of the ECU 10 to an input read connection and an output signal level when waiting (step 1).

A timer Tc for determining a control processing cycle is started (2), a processing from a operation board input read (3) to "data renewal of DNA memory" (7) is implemented, a time-over of the timer Tc is waited (8) and during waiting, a state of electric circuit in the ECU 100 is checked (9), thereby judging whether there is an abnormality (10). If there is no abnormality and the time-over of the timer occurs, the timer is started again (2), a processing from an operation board input read (3) to "data renewal of DMA memory" (7) is implemented. Thus, if an electric circuit in the ECU 100 has no abnormality, the steps 2–10 are repeatedly implemented substantially at the Tc cycle.

If a state (open, close) of switch operated by the driver is read in the operation board input read (3), state information and data, which are referenced in a later-mentioned cruise control (5) and "lane deviation control processing" (6), are read, by DMA transfer, from the GPS information ECU 190, the image processing ECU 140 and the brake control ECU 10 (4). That is, data in a data write area, which is addressed to the cruise control ECU 100, on a memory for DMA transfer within the above ECUs 190 140, 10 is written, by DMA transfer, in a memory for DMA transfer in the cruise control ECU 100, and is read therefrom and written in a reference memory (RAM) for data processing.

Next, "cruise control processing" (5) is implemented. Here, when a fixed speed running instruction switch of the operation/display board 110 is switched from OFF to ON, a vehicle speed at that time (vehicle speed data computed by the brake control ECU 10) is written in an object vehicle speed register. Until the fixed speed running instruction switch is switched to OFF or a fixed speed running release condition is brought into existence, an open/close control for a main throttle valve of engine is performed via the throttle control ECU 80 in such a manner that the vehicle speed coincides with an object vehicle speed (data of the object vehicle speed register). When an inter-vehicle distance control instruction switch of the operation/display board 110 is switched from OFF to ON, until it is switched to OFF or an inter-vehicle distance control release condition is brought into existence, an open/close control for a main throttle valve of engine is performed via the throttle control ECU 80 in such a manner that a distance between a preceding vehicle and the concerned vehicle, which has been detected by the image processing ECU 140, becomes a distance corresponded to the vehicle speed. Incidentally, these controls are realized by repeatedly implementing "cruise control processing" (5) at the constant Tc cycle. Until the aforementioned fixed speed running control or intra-vehicle distance control is started and it is released, in the ECU 100, a state information ("1") representing the fact that it is being implemented is maintained in a cruise state register.

Figure 4:
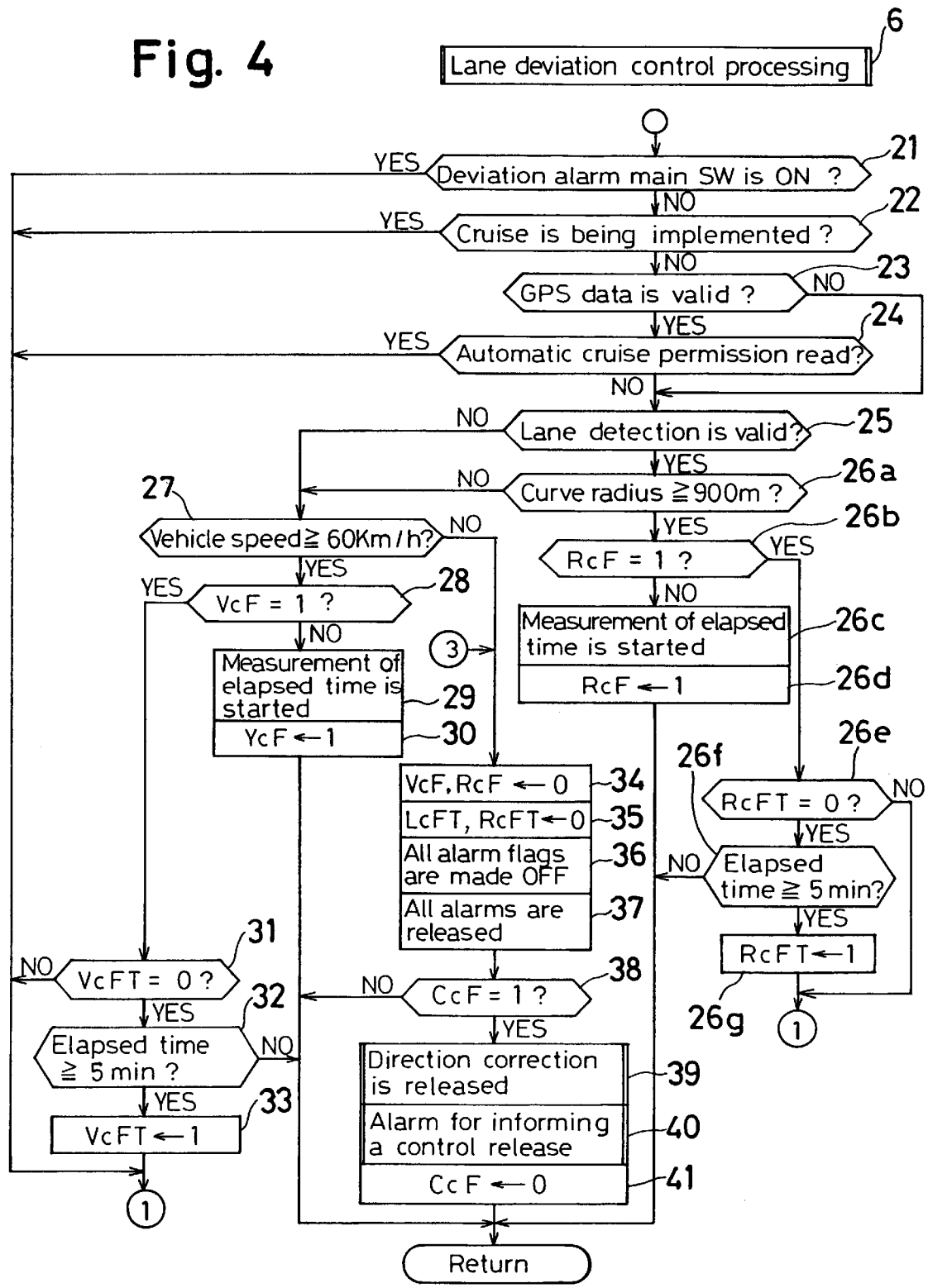
FIG. 4 is a flowchart showing a portion of the "lane deviation control processing" 6 shown in FIG. 3.
Figure 5:
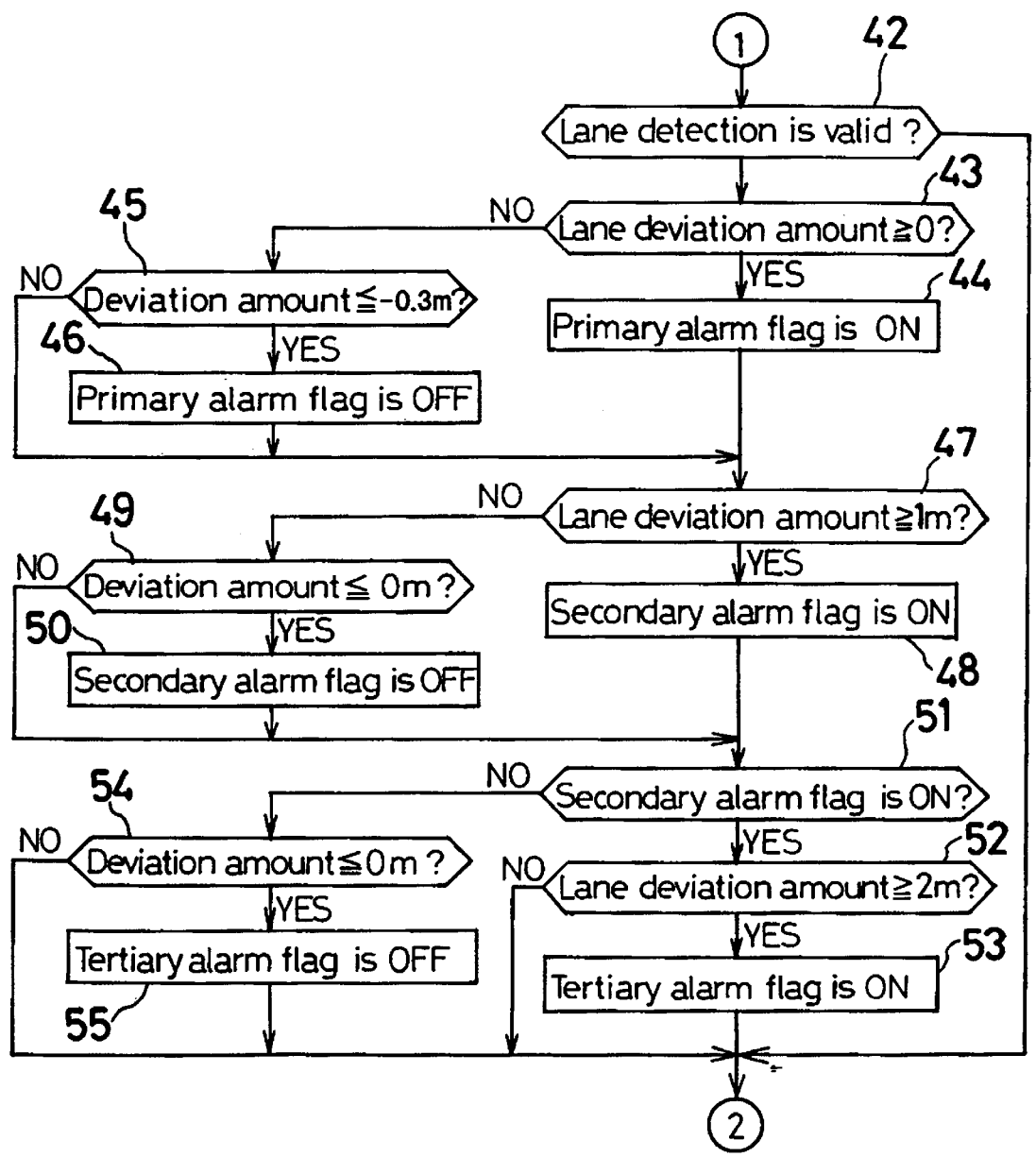
FIG. 5 is a flowchart showing another portion of the "lane deviation control processing" 6 shown in FIG. 3.
Figure 6:
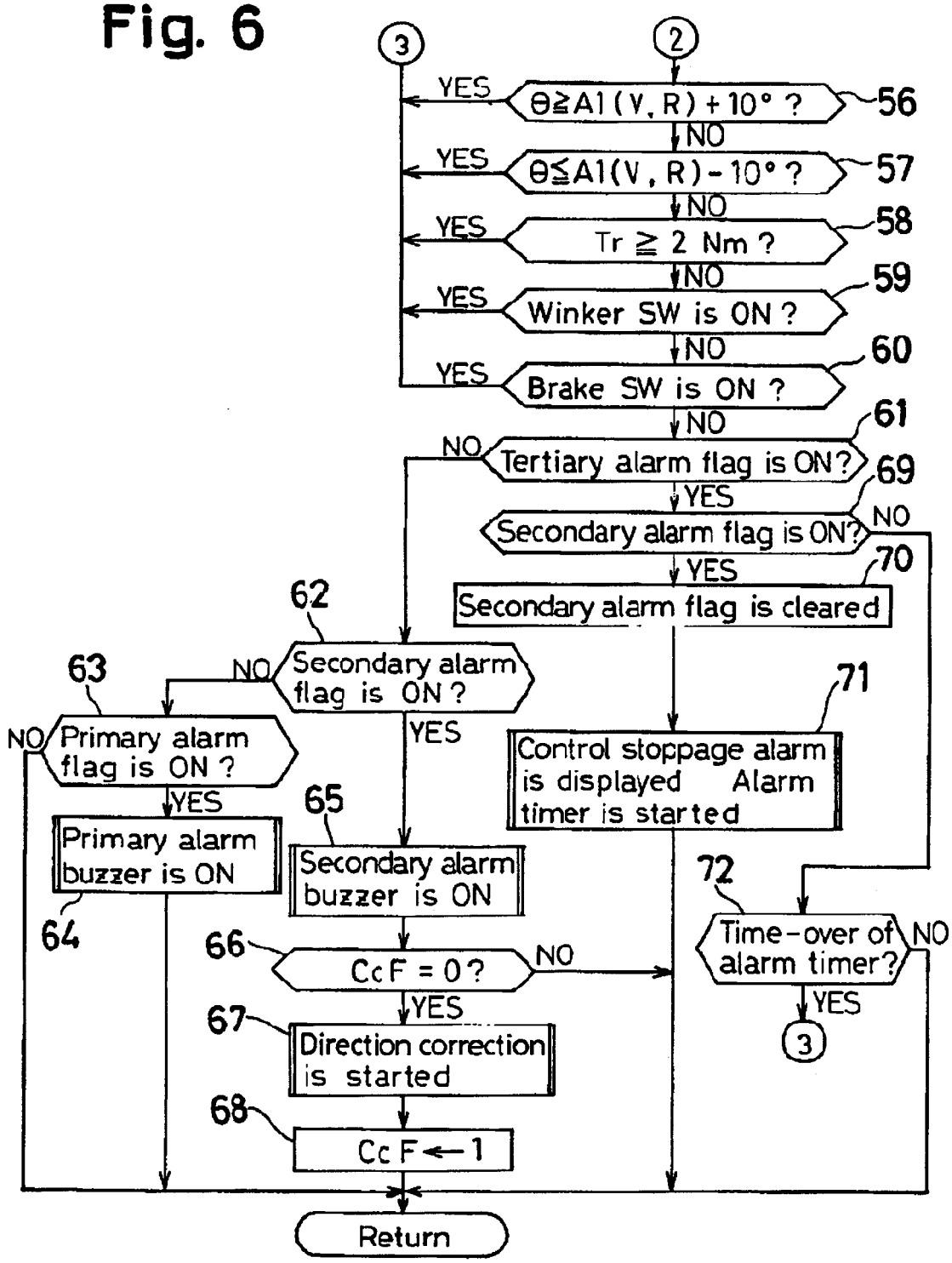
FIG. 6 is a flowchart showing remaining portions of the "lane deviation control processing" 6 shown in FIG. 3.

After passing through "cruise control processing" (5), the ECU 100 implements "lane deviation control processing" (6). Contents of this are shown in FIGS. 4–6. Next, contents of controls are realized by repeatedly implementing "lane deviation control processing" (6) at the constant cycle Tc.

1. Brake steering yes/no testing (21–41 in FIG. 4):

1A: If a deviation alarm main SW becomes ON by the driver, it is judged that the brake steering is yes (21 in FIG. 4), and the process proceeds to deviation alarm testing yes/no testing (42–45) in FIG. 5.

1B: When the deviation alarm main SW is OFF, it is checked whether a state information of the cruise state register is 1 (cruise is being implemented) (22 in FIG. 4), and if the cruise is being implemented, it is judged that the brake steering is yes, and the process proceeds to the deviation alarm yes/no testing (42–45) in FIG. 5.

1C: If the cruise is being implemented, data which has been read in the step 4 and represents a GPS position measurement valid/invalid of the GPS information processing ECU 190 is checked (23), and when it is valid, it is checked whether the read information means a cruise permission road (24). If this is yes, the process proceeds to the deviation alarm yes/no testing (42–45) in FIG. 5. Whether it is the cruise permission read or not is determined by the read information written in a map data base and does not mean whether the cruise is officially permitted or not.

1D: When the GPS position measurement is invalid and when, even if it is valid, the cruise permission is not contained in the read information, data which has been read in the step 4 and represents a lane detection valid/invalid of the image processing ECU 140 is checked (25), and when the lane detection is valid, it is checked whether a curve radius R is larger than 900 m (26). And if the curve radius R is larger than 900 m, its continuation time is measured (26b–c). If the continuation time becomes longer than five minutes (26e–26g), the process proceeds to the deviation alarm yes/no testing (42–55) in FIG. 5.

1E: When the lane detection is invalid and when, even if it is valid, the curve radius R is less than 900 m, it is checked whether a vehicle speed which has been read in the step 4 and computed by the brake control ECU 10 is higher than 60 Km/h (27). If it is higher than 60 Km/h, its continuation time is measured (28–30). If the continuation time becomes longer than five minutes (31–33), it is judged that the brake steering is yes, and the process proceeds to the deviation alarm yes/no testing (42–55) in FIG. 5.

1F: When the deviation alarm main SW is OFF, the cruise is not implemented, the GPS position measurement data is invalid or the cruise permission is not contained in the read information even if that data is valid, a road whose curve radius is larger than 900 m does not continue for a time longer than five minutes even if the lane detection is invalid and the vehicle speed higher than 60 Km/h does not continue for a time longer than five minutes, it is judged the brake steering is no, and the process does not proceed to the deviation alarm yes/no testing (42–45) in FIG. 5.

When this judgment to the effect that the brake steering is not is concluded, there may be such a case that an alarm has been already emitted or further the brake steering has been started by the deviation alarm yes/no testing (42–45) and an output setting (61–72), which are mentioned later. If it is so, when the judgment to the effect that the brake steering is no is concluded, the alarm is released and the brake steering is stopped.

1G: That is, state registers VcF, RcF, LcFT and RcFT for monitoring the aforementioned continuation time are first cleared (34, 35). This brings about stoppage of the continuation time measurement. Next, all alarm flags (data of state register) are made OFF (36) and the all alarms are released (37). Whether the brake steering is being implemented or not is checked by a state register CcF (38). If the brake steering is being implemented a brake steering stoppage is commanded to the brake control ECU 10 (39), and a release alarm for informing a control release is displayed on the operation/display board 20 and setting for energizing a buzzer under a release alarm mode is performed. The state register CcF is cleared (41). Incidentally, when this release alarm is set, a timer is started, and thereafter if a time-over of this timer occurs the alarm is set, a timer is started, and thereafter if a time-over of this timer occurs, the alarm is stopped.

2. Deviation alarm yes/no testing (42–55):

2A: Data representing a lane detection valid/invalid of the image processing ECU 140 is checked. If the lane detection is invalid, since there is no lane deviation amount data or a low reliability, the process proceeds to a brake steering release yes/no testing (56–60 in FIG. 6) jumping the deviation alarm yes/no testing.

If the detection is valid, a lane deviation amount which is being computed by the image processing ECU 140 is checked (43, 45). As mentioned before, the lane deviation amount is one having a larger value among the left-side deviation amount [(Vw/2)–XL] and the right-side deviation amount [(Vw/2)–XR]. In the lane deviation amount data, there are contained a deviation amount numeric value data (including+m, –) and a direction data which indicates whether the deviation is left-side or right-side. If the lane deviation amount is larger than 0 m (vehicle's side edge exists on a lane partition line or protrudes therefrom), 1 (primary alarm yes) is written in a primary alarm flag register (44). If the lane deviation amount is below –0.3 m (position in which vehicle's side edge withdraws from the lane partition line by more than 3 m), the primary alarm flag register is cleared (46). By this, when the deviation amount becomes more than 0 m, the primary alarm flag goes ON (data of the primary alarm flag register=1). If the deviation amount becomes below –0.3 m, the primary alarm flag becomes OFF (data of the primary alarm flag register=0). If the deviation amount is less than 0 in but above –0.3 m, data of the primary alarm flag register is not changed.

2B: If the lane deviation amount becomes more than 1 m, 1 is written in a secondary alarm flag register (47, 48). If the lane deviation amount is below 0 m, the secondary alarm flag register is cleared (49, 50). By this, when the deviation amount becomes more than 1 m, the secondary alarm flag becomes ON. If the deviation amount becomes below 0 m, the secondary alarm flag becomes OFF. If the deviation amount is less than 1 m but above 0 m, data of the secondary data of the secondary alarm flag register is not changed.

2C: When data of the secondary alarm flag register is 1, if the lane deviation amount becomes more than 2 m, 1 is written in a tertiary alarm register (51–53). When data of the secondary alarm flag register is 0, if the deviation amount becomes below 0 m, the tertiary alarm register is cleared (54, 55). By this, if the lane deviation amount is increased and becomes more than 2 m after the secondary flag has become ON, the tertiary alarm flag becomes ON. If the lane deviation amount becomes below 0 m, the tertiary alarm flag becomes OFF. If the deviation amount is less than 2 m but above 0 m, data of the tertiary alarm flag register is not changed.

3. Brake steering release yes/no testing (56–60 in FIG. 6):

3A: It is checked whether a front wheel steering angle θ is an angle which is larger, by more than 10° C., than a steering angle responding to the vehicle speed v and the curve radius R, i.e., a steering angle A1 [v, R] for performing a running of the curve radius R at the vehicle speed v (56, 57). If it is so, it is deemed that the driver is intentionally steering (e.g., in order to avoid another vehicle, obstacle, etc. or to change a traffic lane), and it is judged that the brake steering release is yes and the process proceeds to the release processing (34–41) subsequent to step 34. Content of this release processing is as described in the aforementioned 1G.

3B: It is checked whether a steering torque of front steering mechanism is above 2 Nm (58).

It if is so, it is deemed that the driver is intentionally performing a strong steering operation, and it is judged that the brake steering release is yes and the process proceeds to the release processing (34–41) subsequent to step 34.

3C: State of turn signal SW of a turn signal driver 130 is checked (59). If it is ON (turn signal drive), it is judged that the brake steering release is yes and the process proceeds to the release processing (34–41) subsequent to step 34.

3D: State of brake SW 45 is checked (60). If it is ON (brake pedal is applied), it is judged that the brake steering release is yes and the process proceed to the release processing (34–41) subsequent to step 34. When there is no driver's steering operation, the turn signal is OFF and the brake SW is OFF, it is judged that the brake steering release is no and the process proceed to a brake steering alarm output (61–72) subsequent to step 61.

4. Brake steering alarm output:

4A: When only the primary alarm flag is ON, i.e., when only the primary alarm flag within the primary to tertiary alarm flag register is 1, a primary alarm is displayed on the operation/display board 110 m, and the buzzer 120 is energized under a primary alarm mode 50 as to sound (61–64). Incidentally, this primary alarm continues until data of the primary alarm flag register is cleared, i.e., until the primary alarm flag becomes OFF.

4B: When the secondary flag is ON, the alarm is changed to the secondary alarm. That is, the secondary alarm is displayed on the operation/display board 110, and the buzzer 120 is energized under a secondary mode so as to sound (62, 65). This secondary alarm continues until the alarm flag register is cleared, i.e., until the secondary alarm flag becomes OFF.

If changed to the secondary alarm, it is checked whether the brake steering is being implemented (data of the register CcF is 1) (66). If the brake steering is not being implementation (CcF=0), the travelling direction correction, i.e., the brake steering is started (67). Since an actual brake steering (increase in wheel brake pressure and distribution control) is performed by the brake control ECU 100, here the cruise control ECU 100 writes a correction command [a wheel brake pressure control instruction, a lane deviation amount (value containing+,– or right-side) and a curve radius] in a data area, which is addressed to the brake control ECU 10, of the memory for DMA transfer. The cruise control ECU 100 writes 1 (the brake steering is being implemented) in the register CcF (68). The brake control ECU 10 increases the wheel brake pressure and performs the distribution control in response to the above correction command. That is, the brake steering is performed. Content of this is described later by referring to FIG. 8.

Figure 7:
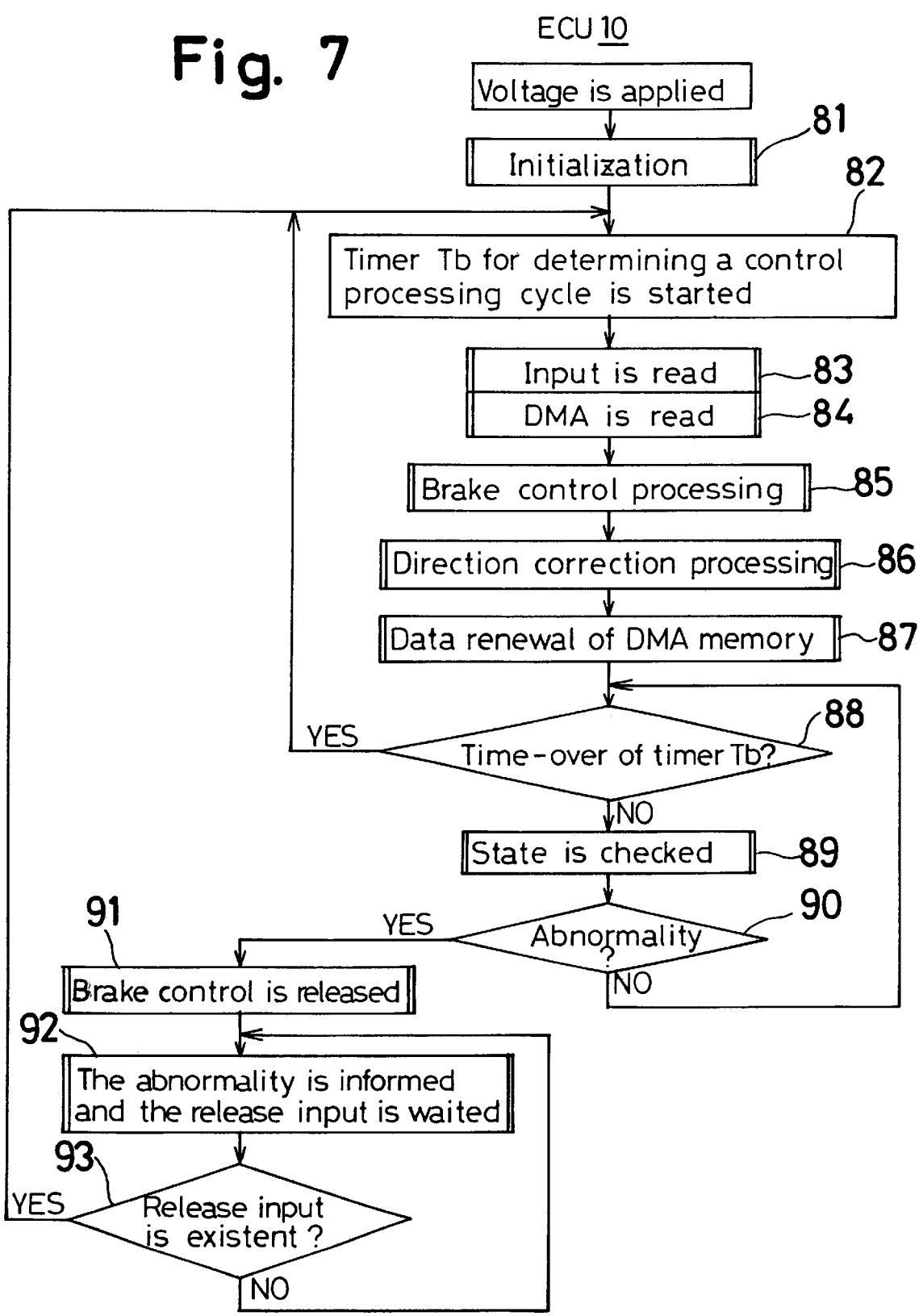
FIG. 7 is a flowchart showing the processing function of the brake control ECU 10 shown in FIG. 1.

4C: When the tertiary alarm flag became ON, the secondary alarm flag is cleared (69, 70), a control stoppage alarm is displayed on the operation/display board 110, and the buzzer 120 is energized under a stoppage alarm and an alarm timer which prescribes a time of this stoppage alarm is started (71). Thereafter, since the tertiary flag is ON and the secondary alarm flag is OFF, a time-over of the alarm timer is waited (72) and if the time-over occurs, the process proceeds to the release processing (34–41) subsequent to the step 34. That is, if the tertiary alarm flag becomes ON (the lane deviation amount is more than 2 m), the stoppage alarm is firstly generated in order to stop the direction correction by the brake steering and thereafter the brake steering is stopped after the set time has elapsed. In FIG. 7, there is shown an outline of processing function of the brake control ECU 10. If an operating voltage is applied, the brake control ECU 10 sets a built-in register, an input/output port and a built-in timer to initial states, and sets an input/output interface to an input read connection and an output signal level during waiting (step 81).

A timer Tb for determining a control processing cycle is started (82), a processing from an input read (83) "data renewal of DMA memory" (87) is implemented and a time-over of the timer Tb is awaited (88). During waiting, a state of electric circuit within the ECU 10 is checked (89) and it is judged whether there is an abnormality or not (90). If there is no abnormality and the time-over of the timer Tb occurs, the timer Tc is started again (82), and a processing from an input read (83) to "data renewal of DMA memory" (87) is implemented. Thus, if there is no abnormality in the electric circuit within the ECU 10, steps 82–90 are repeatedly implemented substantially at a Tb cycle.

At the input read (83), if input of the operation/display board 20 and detection signals of the sensors 41–45. YA, θF, θR, ST, GX and GY are read, a state information referenced at a brake control processing (85) and "direction correction processing" (86), which are mentioned later, and data are read from the cruise control ECU 100 by DMA transfer (84). That is, data in a data write area, which is addressed to the brake control ECU 10, in a memory for DMA transfer within the ECU 100 is written in a memory for DMA transfer within the brake control ECU 10, and is read therefrom and written in a reference data memory (RAM) for data processing.

Next, "brake control processing" (85) is implemented. Content of this is similar to one disclosed in the aforementioned Japanese Patent Unexamined Publication No. 8-207737. However, in the present embodiment, when the wheel brake pressure control of either of "2-BDC control" and "B-STR control" is performed, if data of the flag register CpF is 1 (direction correction demand from the ECU 10 is received), an object yaw rate yawO for brake steering is computed on the basis of command values (lane deviation amount, curve radius R) from the ECU 100. An object yaw rate of the wheel brake pressure distribution control, which has been formed by the ECU 100 for "2-BCD control" and "B-STR control", is corrected (biased) by an amount of the yaw rate yawO for brake steering instructed by the cruise control ECU 100, thereby determining a wheel brake pressure distribution in response to the corrected object yaw rate. By this, a brake steering intended by the cruise control ECU 100 is implemented by the brake control ECU 10. The object yaw rate yawO for brake steering is computed by a computation similar to that in steps 105–107 mentioned later.

After passing through "brake control processing" (85), the ECU 10 proceeds to "direction correction processing" (86). One mode of this content is shown in FIG. 8. Here, the ECU 10 checks whether data of the flag register CpF is 1 (direction correction command from the ECU 100 has been already received) (101). If data of the flag register CpF is 0, it is checked whether there are a brake steering command and command values (lane deviation amount, curve radius R) from the cruise control ECU 100 (102). When they exist, 1 is written in the flag register CpF (103) and a measurement (clocking) of elapsed time T is started (104). On the basis of the lane deviation amount (+, −numeric value and deviation direction) and the curve radius R, an object yaw rate yawO of the brake steering for decreasing the lane deviation amount is computed (105–107).

That is, by making reference to a direction data of the lane deviation amount data (+1−value data and deviation direction data), a yaw rate generated by a change of the vehicle travelling direction along which the deviation amount is decreased and a yaw rate yawS for correction in the same direction are determined (106A, 106B). In the present embodiment, a value (absolute value) of yaw rate (yawS) for correction is determined to ±2°/sec. Next, from the determined yaw rate yawS for correction, a swing yaw rate yawS.(1+sin ωτ) which fluctuates within ±yawS is determined. A sum yawO=(v/R)+yawS (1+sin ωτ) of a vehicle speed v (m/sec) and a yaw rate (v/R), i.e., a yaw rate (v/R) which is inferred that it is generated under the running state at present, is made an object yaw rate for brake steering (107). The mark τ is a clocked value (elapsed time) of clocking started in the step 104. ω is expressed as X=2πf, and f is decided as f=1 Hz in the present embodiment.

Next, it is checked whether data of a register ObsF is 1 ("2-BDC control" or "B-STR control" is being implemented) (108). When data of the register ObsF is 1, since the brake steering by an amount of the object yaw rate yawO in the aforementioned "brake control processing" (85) implemented just before the present processing or after the Tb is implemented as mentioned before, "brake control processing" (85) which is being implemented in this time ceases.

When data of the register ObsF is 0, since the wheel brake pressure control only for brake steering is necessary, a control duty amount is computed (109). A computation expression is shown in a block of the step 109. In this computation expression, the duty (if it is a positive value) is an on-duty of repetition of open (ON=turning on electricity: pressure increase) and close (OFF=no turning on electricity: hold) of a pressure intensifier electromagnetic valve by which a pump discharge pressure is applied to the wheel brake, Kp is a proportional coefficient given to control error amount, yawO is an object yaw rate, Y is a detection value of yaw rate sensor YA, (yawO-Y) is a control error amount and Kd is a proportional coefficient (differential term coefficient) given to differential value d yawO/dt (change speed) of the object yaw rate.

That is, by PD control, the duty for adapting the yaw rate Y of vehicle, to the object yaw rate yawO is computed. On the basis of a direction of the lane deviation and a polarity of the duty, a wheel brake to be pressure-increased is determined. The pressure intensifier electromagnetic valve connected to the determined wheel brake is subjected to ON/OFF in a time series pattern realizing that duty (113–116). By this, with an average of comparatively long time in time series, only a left-front or right-front wheel brake is pressure-increased. When the left-front wheel brake in pressure-increased, the vehicle's travelling direction changes in left direction and when the right-front wheel brake is pressure-increased, it changes in right direction, so that the lane deviation amount is decreased (the vehicle moves toward a lane center). Moreover, with a comparatively short time (instantaneous value) in time series, the traveling direction fluctuates in response to yawS·(1+sin ωτ), so that a yaw rate vibration (lateral acceleration) is applied to the driver. This gives an abnormal feeling to the driver and becomes an incentive to pay attention.

For example, if the deviation direction is right, a brake steering for correcting the vehicle travelling direction to left direction is necessary, and the brake steering to left direction can be realized by pressure increase (duty value plus) of the left-front wheel brake or pressure decrease (duty value minus) of the right-front wheel brake. In the present embodiment, when the brake steering is necessary, since a wheel brake pressure by the brake pedal application does not exist (brake steering during the brake pedal application is not implemented: no brake pressure exists in wheel brakes 51–54), a practical effect of the brake steering by pressure decrease of the wheel brake cannot be expected. Thus, when it becomes a judgment to the effect that the right-front wheel brake should be pressure-decreased, the left-front wheel brake is pressure-increased (113). When it is judged that the pressure increase of either of the wheel brakes is necessary, the ECU 10 drives a brake oil pump of the wheel brake fluid circuit 30. This is common to "brake control processing" (85) and "direction correction processing" (86).

In the step 101, when it is recognized that data of the register CcF is 1 (brake steering is being implemented), the ECU 10 checks whether the cruise control ECU 100 outputted a direction correction release command (117). If it does not exist and there are a brake steering command and command values (lane deviation amount, curve radius R), the brake steering control (105–116) subsequent to the aforementioned step 105 is implemented.

If the cruise control ECU 100 outputs the direction correction release command, the ECU 10 clears the register CcF (118) and checks data of the register ObsF (119). When it is 1 ("2-BDC control" or "B-STR control" is being implemented), the release process ceases at this point of time. In this case, since the register CpF is cleared, when the wheel brake pressure control of either of "2-BDC control" and "B-STR control" is performed in "brake control processing" (85) implemented subsequently, data of the flag register CpF is 0 (there is no direction correction command from the ECU 100), so that the object yaw rate yawO for brake steering is not computed, and a wheel brake pressure distribution is determined in response to the object yaw rate itself of the wheel brake pressure distribution generated by the ECU 10 for "2-BDC control" and "B-STR control".

When data of register ObsF is O ("2-BDC control" and "B-STR control" are not implemented), a pump drive is stopped and all electromagnetic valves are made OFF under the conditions that another "ABS control", "TRC control" are not implemented, and the wheel brake oil circuit 30 is returned to a circuit connection which exerts only an output pressure of brake master cylinder to the wheel brake.

In the aforementioned embodiment, with the yaw rate Y being made a control amount, the wheel brake pressure distribution is controlled in such a manner that the yaw rate Y coincides with the object value yawO, but the control amount may be another physical value which becomes a value corresponding to the steering amount. For example, in the aforementioned embodiment, since the lateral acceleration sensor GY is provided, the lateral acceleration gy may be made a control amount. Further, it may be possible that the lateral acceleration is integrated to compute a lateral movement speed and the lateral movement speed is made a control amount. In any case, by making the yaw rate Y, the lateral acceleration gy and/or the lateral movement speed, each of which becomes a value corresponding to the steering amount, a control amount, a stable brake steering consistent with the vehicle's running state is realized.

Figure 9:
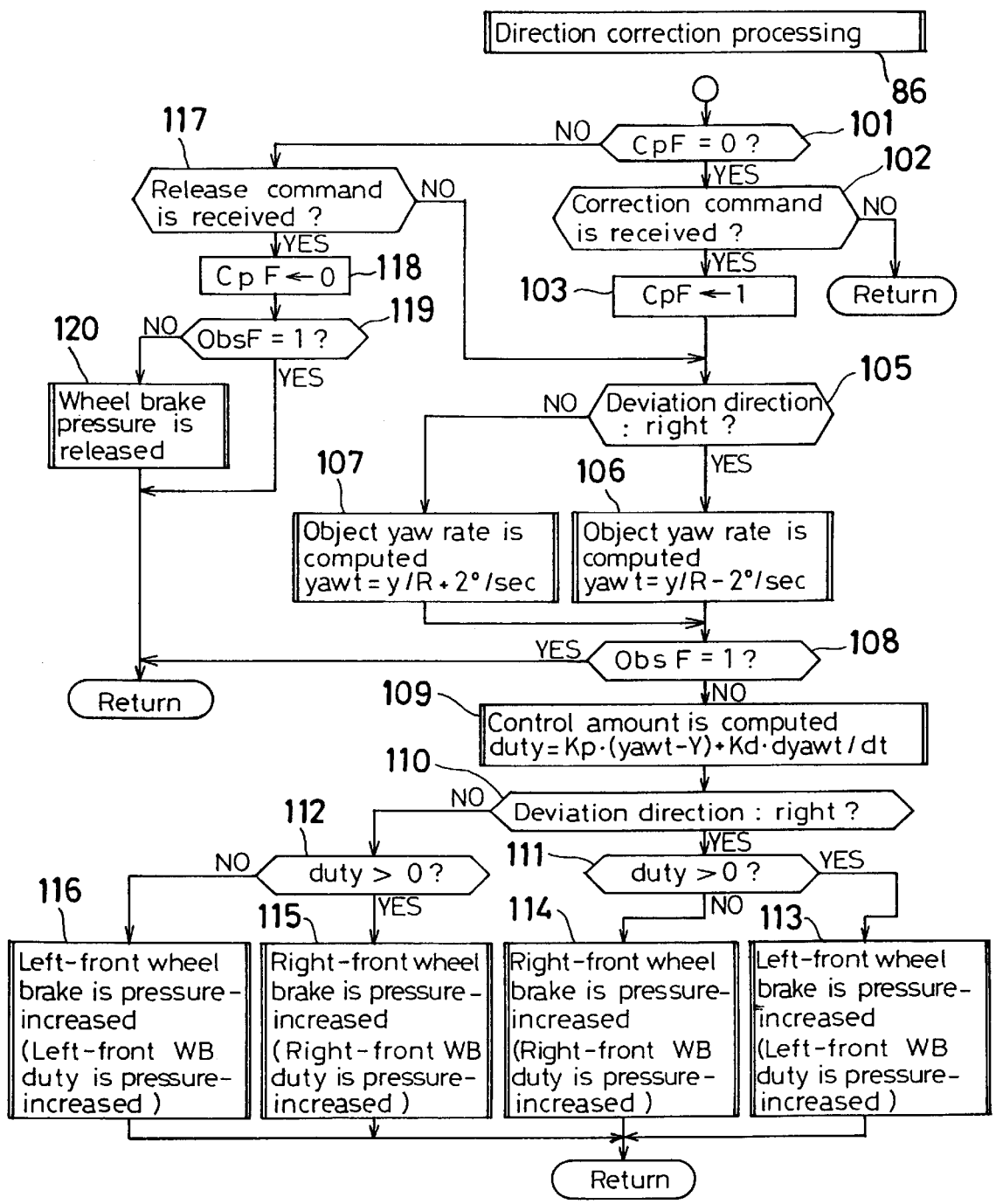
FIG. 9 is a flowchart showing another mode of the "direction correction processing" 86 shown in FIG. 7.

As mentioned above, after passing through "brake control processing (85), the ECU 10 proceeds to "direction correction processing (86), and another mode of this content is shown in FIG. 9. Here, the ECU 10 checks whether data of the flag register CpF is i (direction correction command from the Ecu 100 has been already received) (101). If data of the flag register CpF is O, it is checked whether there are a brake steering command and command values (lane deviation amount, curve radius R) from the cruise control ECU 100. When they exist, 1 is written in the flag register CpF and, on the basis of the lane deviation amount (+,−numeric value and deviation direction) and the curve radius R, the brake steering object rate yawt for reducing this deviation is computed (105'–106'). In this way, rate yawt becomes a value which is obtained by such a calculation that 2°/sec is added to or subtracted from a yaw rate (v/R) appearing with the vehicle speed v(m/sec) at that time and the curve radius R of running vehicle. The value 2°/sec is yaw rate adjustment allowance for reducing the deviation. It is checked whether data of the register ObsF is 1 ("2-BDC control" or "B-STR control" is being implemented) (108). When data of the register ObsF is 1, since the brake steering by an amount of the object yaw rate yawt is implemented in such a manner as mentioned before in the aforementioned "brake control processing" (85) implemented just before the present procession or after the Tb, "brake steering" (85) which is being implemented at present ceases.

When data of the register ObsF is 0, since the wheel brake pressure control only for brake steering is necessary, a control duty amount is computed (109). A computation expression is shown in a block of the step 109. In this computation expression, the duty (if it is a positive value) is an on-duty of repetition of open (ON=turning on electricity: pressure increase) and close (OFF=no turning on electricity: hold) of a pressure intensifier electromagnetic valve by which a pump discharge pressure is applied to the wheel brake, Kp is a proportional coefficient given to control error amount, yawt in an object yaw rate, Y is a detection value of yaw rate sensor YA, (yawt−Y) is a control error amount and Kd is a proportional coefficient (differential term coefficient) given to differential value d yawt/dt (change speed) of the object yaw rate.

That is, by PD control, the duty for adapting the yaw rate Y of vehicle to the object yaw rate yawt is computed. On the basis of a direction of the lane deviation and a polarity of the duty, a wheel brake to be pressure-increased is determined. The pressure intensifier electromagnetic valve connected to the determined wheel brake is subjected to ON/OFF in a timed series pattern realizing that duty (113–116). By this, with an average of comparatively long time in time series, only a left-front or fight-front wheel brake is pressure-increased. When the left-front wheel brake is pressure-increased, the vehicle's travelling direction changes in left direction and when the right-front wheel brake is pressure-increased, it changes in right direction, so that the lane deviation amount is decreased (the vehicle moves toward a lane center).

For example, if the deviation direction is right, a brake steering for correcting the vehicle travelling direction to left direction is necessary, and the brake steering to left direction can be realized by pressure increase (duty value plus) of the left-front wheel brake or pressure decrease (duty value minus) of the right-front wheel brake. In the present embodiment, when the brake steering is necessary, since a wheel brake pressure by the brake pedal application does not exist (brake steering during the brake pedal application is not implemented: no brake pressure exists in wheel brakes 51–54), a practical effect of the brake steering by pressure decrease of the wheel brake cannot be expected. Thus, when it becomes a judgment to the effect that the right-front wheel brake should be pressure-decreased, the left-front wheel brake is pressure-increased (113). When it is judged that the pressure increase of either of the wheel brakes is necessary, the ECU 10 drives a brake fluid pump of the wheel brake oil circuit 30. This is common to "brake control processing" (85) and "direction correction processing" (86).

In the step 101, when it is recognized that data of the register CcF is 1 (brake steering is being implemented), the ECU 10 checks whether the cruise control ECU 100 outputted a direction correction release command (117). If it does not exist and there are a brake steering command and command values (lane deviation amount, curve radius R), the brake steering control (105–116) subsequent to the aforementioned step 105 is implemented.

If the cruise control ECU 100 outputs the direction correction release command, the ECU 10 clears the register CcF (119) and checks data of the register ObsF (119). When it is 1 ("2-BDC control" or "B-STR control" is being implemented), the release process ceases at this point of time. In this case, since the register CpF is cleared, when the wheel brake pressure control of either of "2-BDC control" and "B-STR control" is performed in "brake control processing" (85) implemented subsequently, data of the flag register CpF is 0 (there is no direction correction command from the ECU 100), so that the object yaw rate yawt for brake steering is not computed, and a wheel brake pressure distribution is determined in response to the object yaw rate itself of the wheel brake pressure distribution generated by the ECU 10 for "2-BDC control" and "B-STR control".

When data of register ObsF is O ("2-BDC control" and "B-STR control" are not implemented), a pump drive is stopped and all electromagnetic valves are made OFF under the conditions that another "ABS control", "TRC control" are not implemented, and the wheel brake fluid circuit 30 is returned to a circuit connection which exerts only an output pressure of brake master cylinder to the wheel brake.

In the aforementioned embodiment, if in the travelling direction correction yes/no testing (21–33) at lest one of the following conditions (a)–(e) is brought into existence, it is judged that the travelling direction correction is yes: (a) the deviation alarm main SW is ON, (b) the cruise control is being implemented, (c) the GPS position measurement data is effective and the cruise permission is contained in the read information, (d) the lane detection is effective and the curve radius of larger than 900 m continues for longer than five minutes and (e) the vehicle speed of higher than 60 Km/h continues for longer than five minutes. Although these five conditions are all equivalent, it may be possible to adopt a testing logic which judges that the travelling direction correction is yes when at least two of these five conditions are brought into existence. One example of this is shown in FIG. 10.

Figure 10:
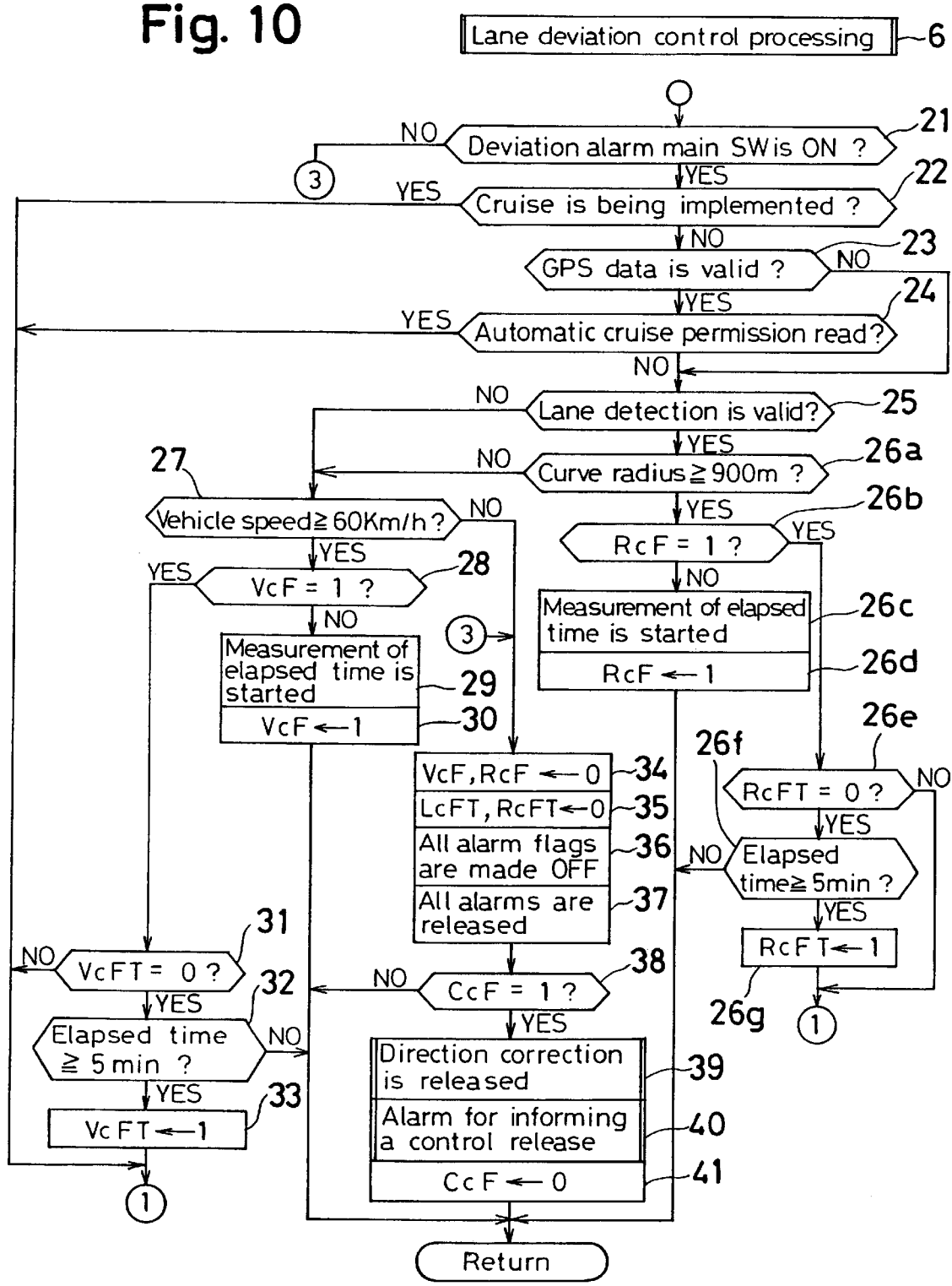
FIG. 10 is a flowchart showing a modified example of the "lane deviation control processing" 6 shown in FIG. 4.

In the example shown in FIG. 10, under a first condition that the deviation alarm main SW is ON, if at least one of the following conditions (i)–(iv) is brought into existence, it is judged that the travelling direction correction is yes: (i) the cruise control is being implemented, (ii) the GPS position measurement data is effective and the cruise control permission is contained in the read information, (iii) the lane detection is effective and the curve radius of larger than 900 m continues for longer than five minutes and (iv) the vehicle speed of higher than 60 Km/h continues for longer than five minutes. If the deviation alarm main SW is switched to OFF, the travelling direction correction is released (21–34–41). In this example, by existence of the first condition (deviation alarm SW is ON) and other of the four conditions, it is judged that the travelling direction correction is yes. It may be possible to adopt another combination. For example, it is judged that the travelling direction correction is yes when the above five conditions are all brought into existence.

In the mode shown in FIG. 10, since the travelling direction correction yes/no is first determined by the driver's will, such a possibility that whether the brake steering is performed or not performed is decided depending on the driver becomes high, so that a realization probability of the automatic detection of lane deviation and the brake steering corresponding to the deviation becomes low correspondingly. In case of a mode in which it is judged that the travelling direction correction is yes when all of the above five conditions are brought into existence, the realization probability becomes further low.

As shown in FIG. 4, in the mode in which it is judged that the travelling direction correction is yes when either of the five conditions is brought into existence, a probability that the brake steering corresponding to the lane deviation is automatically performed is high, and if a reliability of lane deviation detection and brake steering is high, an effect of preventing the vehicle from drifting from the lane due to the driver's carelessness (e.g., sleepiness or looking away) is high. However, such a possibility is also high that the brake steering acting against the driving intended by the driver occurs. In the aforementioned embodiment, a difference from the driving intended by the driver is sensed by the brake steering release testing of the steps 56–60 and the brake steering is released.

While the preferred embodiments have been described, variations thereto will occur to those skilled in the art within the scope of the present inventive concepts which are delineated by the following claims.

What is claimed is:

1. A travelling direction correction apparatus, comprising:
   a shift detection device for detecting a shift amount of a vehicle running on a road, with respect to said road;
   a wheel brake pressure control device for increasing wheel brake pressure and controlling wheel brake pressure distribution; and
   cruise control means for commanding control of said wheel brake pressure distribution to said wheel brake pressure control device, wherein in said control of said wheel brake pressure distribution, the following processes are implemented: (1) at least one of a yaw rate, a lateral speed and a lateral acceleration is set as an index, (2) a value of said index, which occurs when a running direction of said vehicle is changed toward a direction along which said shift amount decreases, is summed with a value of said index, which occurs when said vehicle runs along a curved road, and said summed amount is made an object value, and (3) said value of said index is coincided with said object value.

2. The travelling direction correcting apparatus according to claim 1, further comprising; annunciator means, wherein said cruise control means emits a primary alarm from said annunciator means when said shift amount is more than a first set value, emits a secondary alarm from said annunciator means when said shift amount is more than a second set value which exceeds said first set value, and commands said wheel brake pressure distribution control.

3. The travelling direction correcting apparatus according to claim 1, wherein said index is a yaw rate.

4. A travelling direction correcting apparatus comprising:
a shift detection device for detecting a shift amount of a vehicle running on a road, with respect to said road;
a wheel brake pressure control device for increasing wheel brake pressure of said vehicle and controlling a wheel brake pressure distribution;
annunciator means; and
cruise control means which emits a primary alarm from said annunciator means when said shift amount is more than a first set value, emits a secondary alarm when said shift amount is more than a second set value which exceeds said first set value, and commands control of said wheel brake pressure distribution for decreasing said shift amount and fluctuating said shift amount, in time series, to said wheel brake pressure control device.

5. The travelling direction correcting apparatus according to claim 4 further comprising means for detecting a yaw rate of said vehicle, wherein said wheel brake pressure control device performs a wheel brake pressure distribution in which a vibration yaw rate, which is formed by superimposing a yaw rate increasing/decreasing in time series to a yaw rate for correcting a shift in the same direction as a direction of a yaw rate occurring in said vehicle when the vehicle running direction is changed toward a direction along which said shift amount decreases, is computed and a yaw rate detected by said yaw rate detecting means is changed by an amount of said vibration yaw rate.

6. The travelling direction correcting apparatus according to claim 5, wherein said wheel brake pressure control device performs a wheel brake pressure distribution in which a value, which is obtained by adding said vibration yaw rate to a yaw rate occurring in said vehicle correspondingly to a vehicle speed and a curve radius of said road, is made an object yaw rate and a yaw rate detected by said yaw rate detecting means is coincided with said object yaw rate.

7. The travelling direction correcting apparatus according to claim 6, wherein said cruise control means tests yes/no of a travelling direction correction and, only when it is yes, commands said wheel brake pressure control.

8. The travelling direction correcting apparatus according to claim 7, wherein said cruise control means commands a stoppage of said wheel brake pressure distribution control to said wheel brake pressure control device in response to an operation of equipment on said vehicle, which is performed by a driver.

9. A travelling direction correcting apparatus comprising:
a shift detection device for detecting a shift amount of a vehicle running on a road, with respect to said road;
a wheel brake pressure control device for increasing wheel brake pressure of said vehicle and controlling a wheel brake pressure distribution; and
annunciator means; and
cruise control means for commanding control of said wheel brake pressure distribution to said wheel brake pressure control device to decrease said shift amount, wherein in said wheel brake pressure distribution control the following processes are implemented: (1) yes/no of a travelling direction correction is tested and (2) in the event that it is yes, when said shift amount is more than a first set value a primary alarm is emitted from said annunciator means and when said shift amount is more than a second set value which exceeds said first set value a secondary alarm is emitted from said annunciator means, thereby decreasing said shift amount.

10. The travelling direction correcting apparatus according to claim 9, wherein said cruise control means judges that said travelling direction correction is yes when a vehicle speed automatic control is instructed by a driver.

11. The travelling direction correcting apparatus according to claim 9, wherein said cruise control means judges that said travelling direction correction is yes when a vehicle running speed is higher than a set value and continues for a time longer than a set time.

12. The travelling direction correcting apparatus according to claim 9, wherein said cruise control means judges that said travelling direction correction is yes when running road information obtained on the basis of GPS position measurement and map data are those corresponding to the fact that a vehicle speed automatic control is yes.

13. The travelling direction correcting apparatus according to claim 9, wherein said cruise control means judges that said travelling direction correction is yes when the fact that said travelling direction correction is yes is instructed by a driver.

14. The travelling direction correcting apparatus according to claim 9, wherein said cruise control means judges that said travelling direction correction is yes when a curve radius of running lane detected by a shift detection device is larger than a set value and continues for a time longer than a set time.

15. A travelling direction correcting apparatus comprising:
a shift detection device for detecting a shift amount of a vehicle running on a road, with respect to said road;
a wheel brake pressure control device for increasing wheel brake pressure of said vehicle and controlling a wheel brake pressure distribution; and
annunciator means; and
cruise control means which emits a primary alarm from said annunciator means when said shift amount is more than a first set value, emits a secondary alarm from said annunciator means when said shift amount is more than a second set value which exceeds said first set value, commands control of said wheel brake pressure distribution to decrease said shift amount to said wheel brake pressure control device and commands a stoppage of control of said wheel brake pressure distribution to said wheel brake pressure control device in response to an operation of equipment on said vehicle, which is performed by a driver.

16. The travelling direction correcting apparatus according to claim 15, wherein said operation of equipment on said vehicle, which is performed by a driver, is a turning of a steering wheel on said vehicle.

17. The travelling direction correcting apparatus according to claim 15, wherein said operation of equipment on said vehicle, which is performed by a driver, is turning of a steering wheel on said vehicle, whose rotational torque is larger than a set value.

18. The travelling direction correcting apparatus according to claim 15, wherein said operation of equipment on said vehicle, which is performed by a driver, is a turn signal operation.

19. The travelling direction correcting apparatus according to claim 15, wherein said operation of equipment on said vehicle, which is performed by a driver, is an application of a brake pedal.

20. A travelling direction correcting apparatus comprising:
- a shift detection device for detecting a shift amount of a vehicle running on a road, with respect to said road;
- a wheel brake pressure control device for increasing wheel brake pressure of said vehicle and controlling a wheel brake pressure distribution; and
- annunciator means; and
- cruise control means which emits a primary alarm from said annunciator means when said shift amount is more than a first set value, emits a secondary alarm from said annunciator means when said shift amount is more than a second set value which exceeds said first set value, commands control of said wheel brake pressure distribution to decrease said deviation amount to said wheel brake pressure control device, and, commands a stoppage of said control of said wheel brake pressure distribution to said wheel brake pressure control device, thereby stopping said alarm or changing said alarm to another annunciation.

* * * * *